United States Patent
Xu et al.

(10) Patent No.: US 12,418,363 B2
(45) Date of Patent: Sep. 16, 2025

(54) ELECTRONIC DEVICE, METHOD AND STORAGE MEDIUM FOR WIRELESS COMMUNICATION

(71) Applicant: Sony Group Corporation, Tokyo (JP)

(72) Inventors: Wei Xu, Jiangsu (CN); Shuhan Zhu, Jiangsu (CN); Zhikun Wu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 303 days.

(21) Appl. No.: 17/925,839

(22) PCT Filed: Jun. 16, 2021

(86) PCT No.: PCT/CN2021/100287
§ 371 (c)(1),
(2) Date: Nov. 17, 2022

(87) PCT Pub. No.: WO2021/254371
PCT Pub. Date: Dec. 23, 2021

(65) Prior Publication Data
US 2023/0198674 A1    Jun. 22, 2023

(30) Foreign Application Priority Data
Jun. 19, 2020   (CN) .......................... 202010564823.2

(51) Int. Cl.
*H04L 1/00*     (2006.01)
*H04L 1/1607*   (2023.01)
(Continued)

(52) U.S. Cl.
CPC .......... *H04L 1/0075* (2013.01); *H04L 1/0063* (2013.01); *H04L 1/0064* (2013.01);
(Continued)

(58) Field of Classification Search
CPC ............ H04L 1/0001–248; H04W 28/04–065; H04W 84/005–22; H04W 88/02–12;
(Continued)

(56) References Cited

U.S. PATENT DOCUMENTS

2015/0043414 A1*  2/2015  Han ....................... H04L 1/201
2020/0120459 A1*  4/2020  Nguyen .............. H04W 28/065

FOREIGN PATENT DOCUMENTS

CN    101953106 A    1/2011
CN    107211338 A    9/2017
(Continued)

OTHER PUBLICATIONS

International Search Report and Written Opinion mailed on Aug. 27, 2021, received for PCT Application PCT/CN2021/100287, filed on Jun. 16, 2021, 8 pages including English Translation.

*Primary Examiner* — Timothy J Weidner
(74) *Attorney, Agent, or Firm* — XSENSUS LLP

(57) ABSTRACT

The present disclosure relates to electronic devices, methods, and storage media for wireless communications. A method is described for a control device in communication with a plurality of terminal devices, the method comprising: generating signals for the plurality of terminal devices; generating signals to be sent to the plurality of terminal devices based on the signals for the plurality of terminal devices, the signals comprising a combined signal to be sent to at least one of the plurality of terminal devices, the combined signal including all or part of signals for at least two terminal devices to facilitate signal reception by the at least two terminal devices; and sending the signals to the plurality of terminal devices.

3 Claims, 21 Drawing Sheets

(51) Int. Cl.
*H04L 1/1812* (2023.01)
*H04W 28/04* (2009.01)
*H04W 28/06* (2009.01)
*H04W 84/02* (2009.01)
*H04W 88/02* (2009.01)
*H04W 88/08* (2009.01)
*H04W 92/02* (2009.01)
*H04W 92/10* (2009.01)
*H04W 92/18* (2009.01)

(52) U.S. Cl.
CPC .......... *H04L 1/0076* (2013.01); *H04L 1/1621* (2013.01); *H04L 1/1812* (2013.01); *H04W 28/04* (2013.01); *H04W 28/065* (2013.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01)

(58) Field of Classification Search
CPC ..... H04W 92/02–04; H04W 92/10–12; H04W 92/16–20
See application file for complete search history.

(56) References Cited

FOREIGN PATENT DOCUMENTS

| CN | 109474392 A | 3/2019 | |
|---|---|---|---|
| CN | 109792594 A | 5/2019 | |
| CN | 110611888 A | 12/2019 | |
| CN | 111148077 A | * 5/2020 | ........... H04L 1/1864 |

\* cited by examiner

FIG. 5

ELECTRONIC DEVICE, METHOD AND STORAGE MEDIUM FOR WIRELESS COMMUNICATION

CROSS-REFERENCE TO RELATED APPLICATIONS

The present application is based on PCT filing PCT/CN2021/100287, filed Jun. 16, 2021, which claims priority to CN 202010564823.2, filed Jun. 19, 2020, the entire contents of each are incorporated herein by reference.

TECHNICAL FIELD

The present disclosure relates generally to systems and methods for wireless communication, and in particular to techniques for transmitting data between wireless devices.

BACKGROUND

In wireless communication systems, the Hybrid Automatic Repeat reQuest (HARQ) mechanism combines forward error correction coding with automatic repeat request. A receiving device shall send HARQ feedback to a transmitting device after receiving a data transmission from the transmitting device. When the receiving device determines that the data transmission has been received correctly, the HARQ feedback is Acknowledgement (ACK) feedback; when the receiving device determines that the data transmission has not been received correctly, the HARQ feedback is Negative Acknowledgement (NACK) feedback; when the terminal device does not receive a signal within a predetermined time, the HARQ feedback may not be sent to a control device, or NACK feedback may be sent, so that the transmitting device retransmits the signal. Thereafter, the receiver can perform soft combining for the received retransmission signal and previously received signal before decoding. Since the HARQ mechanism has a certain diversity gain, the number of retransmissions can be reduced to a certain extent, speeding up successful transmissions of signals.

As a relatively new technology, blind retransmission technology has been applied in wireless communication systems. In this technology, previously transmitted signals are retransmitted multiple times before a transmitting device knows whether the previously transmitted signals were successfully received by a receiving device (i.e., before the receiving device sends feedback or before the transmitting device receives feedback). Using redundant transmission, the receiving device can receive multiple retransmission signals in a short waiting time, so as to facilitate fast decoding and reduce the overall latency of a communication system.

In scenarios where multiple terminal devices operate cooperatively (for example, remote surgery, remote games, factory automation, etc.), in order to ensure the high accuracy of the entire system, each terminal device needs to perform the same or different tasks in the same time slot. In this kind of scenarios, maintaining good wireless communication performance is very important. Therefore, there is a need for systems and methods that can further improve reliability of communications and reduce communication latency.

SUMMARY

The present disclosure proposes an efficient HARQ mechanism for multiple terminal devices, and proposes a method for transmitting combined signals in stages such as blind retransmission for data transmission in a mutual aid manner, thereby improving reliability of communications and reducing communication latency.

According to a first aspect of the present disclosure, there is provided an electronic device for a control device in communication with a plurality of terminal devices, the electronic device comprising a processing circuit configured to: generate signals for the plurality of terminal devices; generate signals to be sent to the plurality of terminal devices based on the signals for the plurality of terminal devices, the signals comprising a combined signal to be sent to at least one of the plurality of terminal devices, the combined signal including all or part of signals for at least two terminal devices to facilitate signal reception by the at least two terminal devices; and send the signals to the plurality of terminal devices.

Correspondingly, according to the first aspect of the present disclosure, there is also provided a method for a control device in communication with a plurality of terminal devices, the method comprising: generating signals for the plurality of terminal devices; generating signals to be sent to the plurality of terminal devices based on the signals for the plurality of terminal devices, the signals comprising a combined signal to be sent to at least one of the plurality of terminal devices, the combined signal including all or part of signals for at least two terminal devices to facilitate signal reception by the at least two terminal devices; and sending the signals to the plurality of terminal devices.

According to a second aspect of the present disclosure, there is provided an electronic device for a terminal device, the electronic device comprising a processing circuit configured to: receive a signal from a control device, wherein the signal comprises a combined signal including all or part of signals for at least two terminal devices; and obtain all or part of signal for each of the at least two terminal devices from the combined signal.

Correspondingly, according to the second aspect of the present disclosure, there is also provided a method for a terminal device, the method comprising: receiving a signal from a control device, wherein the signal comprises a combined signal including all or part of signals for at least two terminal devices; and obtaining all or part of signal for each of the at least two terminal devices from the combined signal.

According to a third aspect of the present disclosure, there is provided an electronic device for a control device in communication with a plurality of terminal devices in a cluster, the plurality of terminal devices including a master terminal device and one or more slave terminal devices, the electronic device comprising a processing circuit configured to: for data transmissions from the control device to the plurality of terminal devices in the cluster, receive cluster hybrid automatic repeat request (HARQ) feedback from the master terminal device, wherein the cluster HARQ feedback is generated based on HARQ feedback from the master terminal device and HARQ feedback sent from the slave terminal devices to the master terminal device.

Correspondingly, according to the third aspect of the present disclosure, there is also provided a method for a control device in communication with a plurality of terminal devices in a cluster, the plurality of terminal devices including a master terminal device and one or more slave terminal devices, the method comprising: for data transmissions from the control device to the plurality of terminal devices in the cluster, receiving cluster hybrid automatic repeat request (HARQ) feedback from the master terminal device, wherein the cluster HARQ feedback is generated based on HARQ feedback from the master terminal device and HARQ feedback sent from the slave terminal devices to the master terminal device.

According to a fourth aspect of the present disclosure, there is provided an electronic device for a terminal device, the terminal device being a master terminal device in a cluster, and the cluster further comprising one or more slave terminal devices, the electronic device comprising a processing circuit configured to: for data transmissions from a control device to a plurality of terminal devices in the cluster: receive hybrid automatic repeat request (HARQ) feedback from slave terminal devices in the cluster; generate cluster HARQ feedback based on its own HARQ feedback and the received HARQ feedback from the slave terminal devices; and send the cluster HARQ feedback to the control device.

Correspondingly, according to the fourth aspect of the present disclosure, there is also provided a method for a terminal device, the terminal device being a master terminal device in a cluster, and the cluster further comprising one or more slave terminal devices, the method comprising: for data transmissions from a control device to a plurality of terminal devices in the cluster: receiving hybrid automatic repeat request (HARQ) feedback from slave terminal devices in the cluster; generating cluster HARQ feedback based on its own HARQ feedback and the received HARQ feedback from the slave terminal devices; and sending the cluster HARQ feedback to the control device.

According to a fifth aspect of the present disclosure, there is provided an electronic device for a terminal device, the terminal device being a slave terminal device in a cluster, and the cluster further comprising a master terminal device, the electronic device comprising a processing circuit configured to: for data transmissions from the control device to a plurality of terminal devices in the cluster: send hybrid automatic repeat request (HARQ) feedback to the master terminal device, so that the master terminal device generates cluster HARQ feedback based on the HARQ feedback and its own HARQ feedback and sends the cluster HARQ feedback to the control device.

Correspondingly, according to the fifth aspect of the present disclosure, there is also provided a method for a terminal device, the terminal device being a slave terminal device in a cluster, and the cluster further comprising a master terminal device, the method comprising: for data transmissions from the control device to a plurality of terminal devices in the cluster: sending hybrid automatic repeat request (HARQ) feedback to the master terminal device, so that the master terminal device generates cluster HARQ feedback based on the HARQ feedback and its own HARQ feedback and sends the cluster HARQ feedback to the control device.

According to a sixth aspect of the present disclosure, there is provided a computer readable storage medium having one or more instructions stored thereon, which, when executed by one or more processors of an electronic device, cause the electronic device to perform methods according to various embodiments of the present disclosure.

According to a seventh aspect of the present disclosure, there is provided an apparatus for wireless communication, the apparatus comprising means or units for performing methods according to various embodiments of the present disclosure.

The above summary is provided to summarize some exemplary embodiments in order to provide a basic understanding to various aspects of the subject matter described herein. Therefore, above features are merely examples and should not be construed as limiting the scope or spirit of the subject matter described herein in any way. Other features, aspects, and advantages of the subject matter described herein will become apparent from the Detailed Description described below in conjunction with the drawings.

BRIEF DESCRIPTION OF THE DRAWINGS

A better understanding of the present disclosure can be obtained when the following detailed description of embodiments is considered in conjunction with the accompanying drawings. The same or similar reference numbers are used throughout various drawings to denote the same or similar components. The accompanying drawings, along with the following detailed description, are incorporated in and constitute a part of this specification, to illustrate embodiments of the disclosure and to explain the principles and advantages of the disclosure. Wherein:

FIG. 5 illustrates a schematic diagram of an example of a combined signal according to an embodiment of the present disclosure.

While the embodiments described in this disclosure may be susceptible to various modifications and alternatives, specific embodiments thereof are illustrated by way of example in the accompanying drawings and are described in detail herein. It should be understood, however, that the drawings and detailed description thereof are not intended to limit the embodiments to the particular forms disclosed; rather, it is intended to cover all modifications, equivalents and alternative falling within the spirit and scope of the claims.

DETAILED DESCRIPTION

The following describes representative applications of various aspects of the device and method according to the present disclosure. The description of these examples is merely to add context and help to understand the described embodiments. Therefore, it is clear to those skilled in the art that the embodiments described below can be implemented without some or all of the specific details. In other instances, well-known process steps have not been described in detail to avoid unnecessarily obscuring the described embodiments. Other applications are also possible, and the solution of the present disclosure is not limited to these examples.

Figure 1:
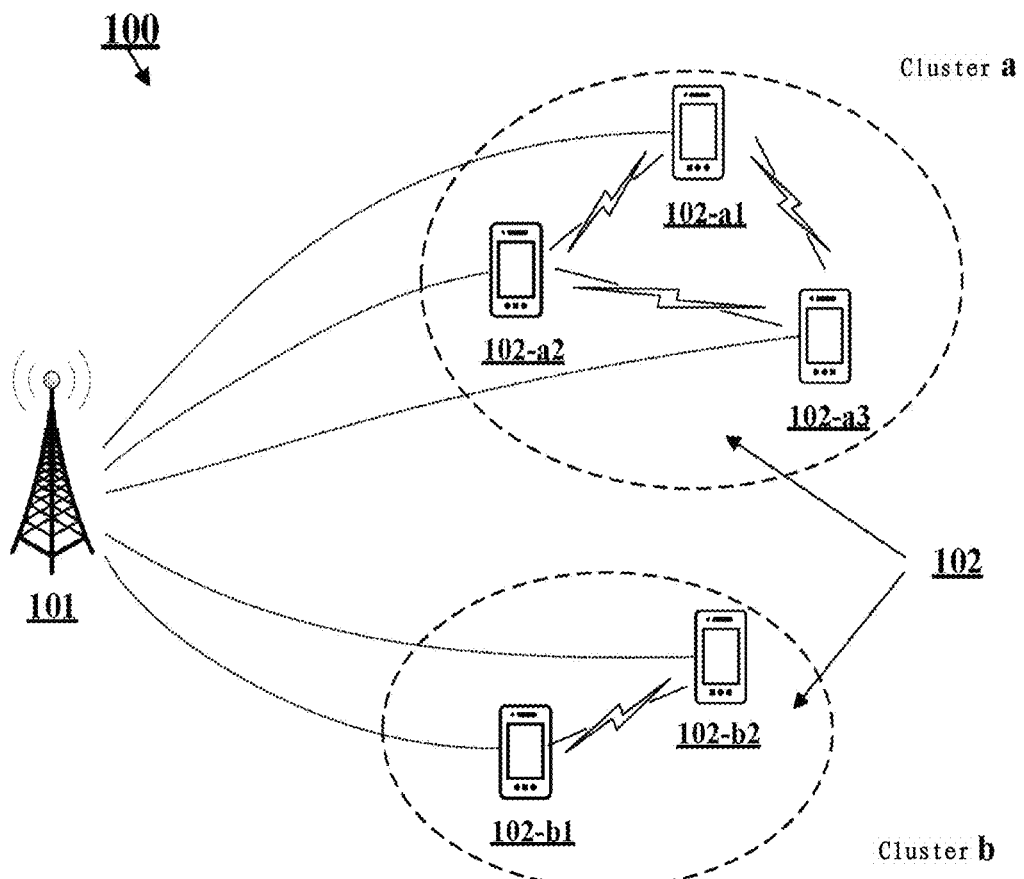
FIG. 1 illustrates an example scenario diagram of a wireless communication system according to an embodiment of the present disclosure.

FIG. 1 illustrates an example scenario diagram of a wireless communication system according to an embodiment of the present disclosure. It should be understood that the wireless communication system shown in FIG. 1 can be implemented as one of the following: a cellular network system, a Wireless Local Area Network (WLAN) system, an Internet of Things system, and the like. The features of the present disclosure can be implemented in any of a variety of systems as desired.

As shown in FIG. 1, the wireless communication system 100 includes a control device 101 and one or more terminal devices 102. The control device and the terminal devices may be configured to communicate through a wireless transmission medium. The control device 101 can also be configured to communicate with a network (e.g., a core network of a cellular service provider, a telecommunications network such as a public switched telephone network (PSTN), and/or the Internet, not shown). Therefore, the control device 101 can facilitate communication between the terminal devices 102 and/or between the terminal devices 102 and the network.

As shown in FIG. 1, the terminal devices 102 can be divided into one or more clusters. As an example, two clusters are shown in FIG. 1: cluster a and cluster b, where cluster a includes terminal devices 102-a1, 102-a2 and 102-a3, and cluster b includes terminal devices 102-b1 and 102-b2. Communication between the control device 101 and the terminal devices 102 can be performed through one of a cellular link, a Wireless Local Area Network (WLAN) link, or a Vehicle-to-Vehicle (V2V) link, while communications between terminal devices in the same cluster can be performed through a Device-to-device (D2D) link. The D2D link may be, for example, a direct link between devices (also referred to as a sidelink in communication protocols). Each cluster may include one master terminal device and one or more slave terminal devices. For example, the master terminal device in cluster a is 102-a2 and the slave terminal devices include 102-a1 and 102-a3; the master terminal device in cluster b is 102-b1 and the slave terminal device is 102-b2. The master terminal device can perform several operations on behalf of the slave terminal devices. It should be understood that, in some embodiments, the number of master terminal devices may also be greater than one, and the relationship among the multiple master terminal devices may be equal or subordinate.

It should be understood that in this disclosure, the term "control device" has the full breadth of its ordinary meaning, generally referring to the end of a communication system that has control functions over transmissions. Similarly, the term "terminal device" has the full breadth of its ordinary meaning, and accordingly may refer to a mobile station, a user equipment, etc. in a communication system. As an example, in a cellular network, a "control device" can be a "base station", or a "control device" can be implemented as a part of a "base station". A "terminal device" can be a "user equipment" (hereinafter may be referred to as a "user" in short), or a "terminal device" can be implemented as a part of the "user equipment".

In some embodiments, multiple devices in one cluster (such as devices 102-a1, 102-a2, 102-a3 in cluster a) have strict requirements on timing when participating in cooperative communications. In practice, a problem of misalignment of working times often occurs in collaborative communications of multiple terminal devices, which seriously affects the user experience. In one example, when a devices in cluster a are player devices for a 3D virtual game, if network delay differences among multiple player devices (i.e., working time differences in a cooperative communication of multiple terminal devices) is too large, the game will be considered unfair to current players, resulting in poor user experience. In another example, when multiple devices in cluster a participate in remote surgery, the deviation of the times when the multiple terminal devices receive signals is likely to cause major errors and lead to accidents. Therefore, there is a need to achieve communications with high reliability and low latency in a cluster. Regarding to this, the present disclosure proposes the following exemplary electronic devices for a control device and a terminal device, so that multiple terminal devices can realize data transmission in a mutual aid manner, thereby being able to work more cooperatively.

Figure 2:
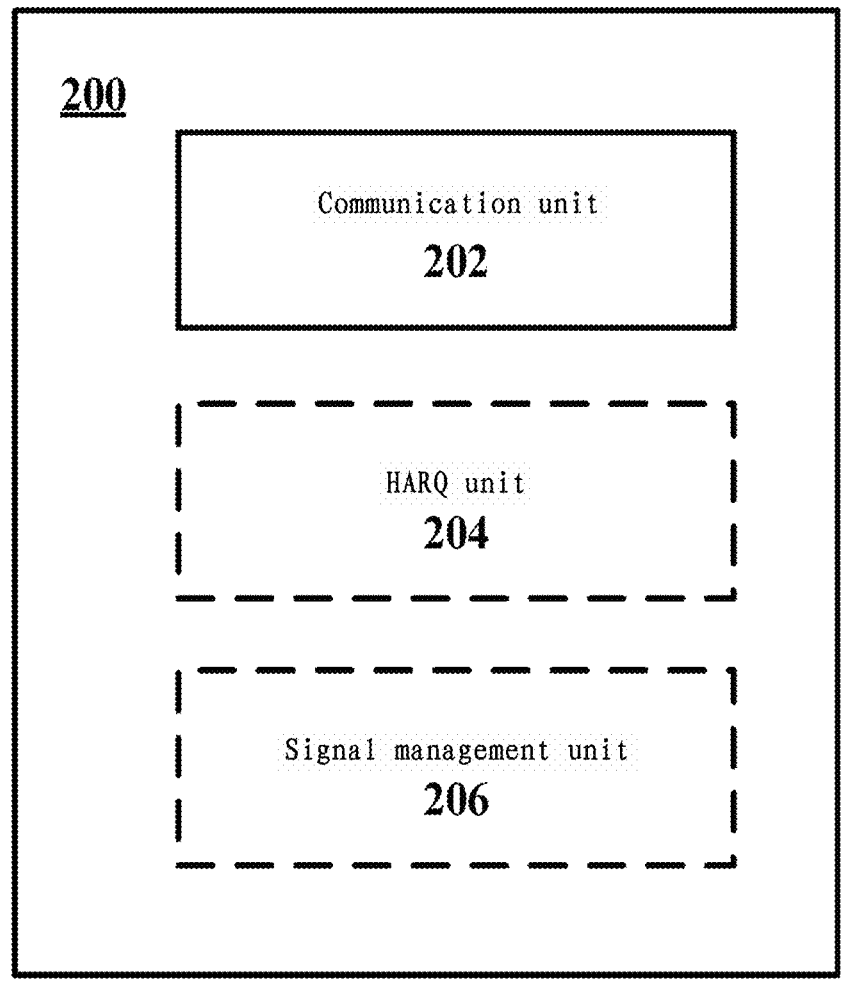
FIG. 2 illustrates an exemplary electronic device for a control device according to an embodiment of the present disclosure.

FIG. 2 illustrates an exemplary electronic device for a control device 101 according to an embodiment of the present disclosure. The electronic device 200 shown in FIG. 2 may include various units to implement embodiments according to the present disclosure. In this example, the electronic device 200 includes a communication unit 202, and optionally a HARQ unit 204 and a signal management unit 206. In one implementation, the electronic device 200 is implemented as the control device 101 itself or as a part thereof, or as a device related to the control device 101 or as a part of the device. Various operations described below in connection with the control device can be implemented by the units 202, 204, 206 of the electronic device 200 or other possible units.

As previously described with reference to FIG. 1, the control device 101 in the system 100 divides a plurality of terminal devices 102 into one or more clusters, and designates a master terminal device and slave terminal devices in each cluster. In an embodiment, the communication unit 202 of the electronic device 200 may be configured to perform data transmission with the terminal devices 102 in the cluster. The HARQ unit 204 receives cluster HARQ feedback from the master terminal device for data transmissions from the control device 101 to a plurality of terminal devices in the cluster, where the cluster HARQ feedback is generated based on HARQ feedback from the master terminal device and HARQ feedback sent from the slave terminal devices to the master terminal device.

In further embodiments, the signal management unit 206 of the electronic device 200 may be configured to generate a signal for a plurality of terminal devices. The signal management unit 206 can also be configured to generate signals to be sent to the plurality of terminal devices based on the signals for the plurality of terminal devices, the signals comprising a combined signal to be sent to at least one terminal device of the plurality of terminal devices, the combined signal includes all or part of signals for at least two terminal devices to facilitate signal reception by the above at least two terminal devices. Thereafter, the communication unit 202 of the electronic device 200 may transmit a signal including the combined signal to the above plurality of terminal devices.

It should be understood that the electronic device 200 may include a communication unit 202 and a HARQ unit 204 to realize the function of receiving cluster HARQ feedback; the electronic device 200 may also include a communication unit 202 and a signal management unit 206 to realize the function of generating a combined signal. Further, the electronic device 200 may include a communication unit 202, a HARQ unit 204 and a signal management unit 206 to realize the functions of receiving cluster HARQ feedback and generating a combined signal for transmission.

Figure 3:
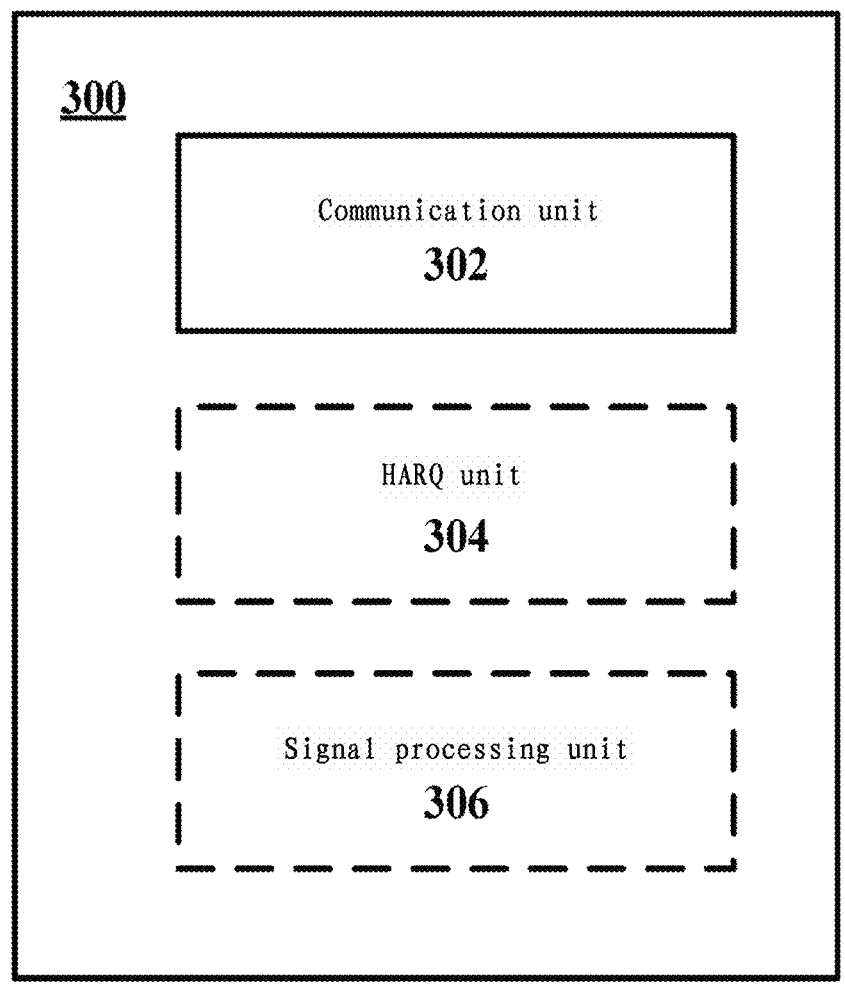
FIG. 3 illustrates an exemplary electronic device for a terminal device according to an embodiment of the present disclosure.

FIG. 3 illustrates an exemplary electronic device 300 for the terminal device 102 in the system 100 according to an embodiment of the present disclosure. The electronic device 300 shown in FIG. 3 may include various units to implement embodiments according to the present disclosure. In this example, similar to the electronic device 200, the electronic device 300 includes a communication unit 302 and optionally, a HARQ unit 304 and a signal processing unit 306. In one implementation, the electronic device 300 is implemented as the terminal device 102 itself or a part thereof, or as a device for controlling the terminal device 102 or otherwise related to the terminal device 102 or as a part of the device. Various operations described below in connection with the terminal device can be implemented by the units 302, 304, 306 of the electronic device 300 or other possible units.

As described above with reference to FIG. 1, the terminal device 102 can know whether it is a master terminal device or a slave terminal device in a cluster according to an instruction of the control device 101, so as to perform respective operations. The communication unit 302 may be configured to perform data transmissions with the control device 101 in the system 100, and can also be configured to communicate with other terminal devices 102 that belong to the same cluster as itself.

In one embodiment, the terminal device 102 is a master terminal device in a cluster, and for data transmissions from the control device 101 to a plurality of terminal devices in the cluster, the HARQ unit 304 of the terminal device 102 instructs to receive the HARQ feedback from slave terminal devices in the cluster, generate cluster HARQ feedback based on its own HARQ feedback and the received HARQ feedback from slave terminal devices, and send the cluster HARQ feedback to the control device 101. In another embodiment, the terminal device 102 is a slave terminal device in a cluster, and for data transmissions from the control device 101 to a plurality of terminal devices in the cluster, the HARQ unit 304 of the terminal device 102 instructs to send HARQ feedback to the master terminal device, so that the master terminal device generates cluster HARQ feedback based on the HARQ feedback and its own HARQ feedback and sends the cluster HARQ feedback to the control device 101.

In a further embodiment, the communication unit 302 of the electronic device 300 may be configured to receive a signal from the control device 101, wherein the signal comprises a combined signal, and the combined signal includes all or part of signals for at least two terminal devices. Further, the signal processing unit 306 can obtain all or part of signal for each of the above at least two terminal devices from the combined signal, and can forward the obtained signals for other terminal devices to respective terminal devices through the communication unit 302. In addition, the communication unit 302 can also receive all or part of the signal for the electronic device 300 from other terminal devices after decomposing the combined signal.

It should be understood that the electronic device 300 may include a communication unit 302 and a HARQ unit 304 to realize the function of generating cluster HARQ feedback; the electronic device 300 may also include a communication unit 302 and a signal processing unit 306 to realize the function of decomposing combining signals. Further, the electronic device 300 may include a communication unit 302, a HARQ unit 304 and a signal processing unit 306 to realize the functions of generating cluster HARQ feedback and decomposing combined signals for forwarding.

In some embodiments, the electronic devices 200 and 300 can be implemented at the chip level, or may also be implemented at the device level by including other external components (e.g., radio links, antennas, etc.). For example, each electronic device can function as a communication device as a whole.

It should be noted that above units are only logical modules divided according to specific functions they implement, and are not used to limit specific implementations, for example, they can be implemented in software, hardware, or a combination of software and hardware. In practical implementations, above units can be implemented as independent physical entities, or can also be implemented by a single entity (e.g., a processor (CPU or DSP, etc.), an integrated circuit, etc.). Wherein, the processing circuit may refer to various implementations of digital circuitry, analog circuitry, or mixed-signal (combination of analog and digital) circuitry that perform functions in a computing system. The processing circuits may include, for example, circuits such as Integrated Circuits (ICs), Application Specific Integrated Circuits (ASICs), portions or circuits of individual processor cores, entire processor cores, individual processors, programmable hardware devices such as Field Programmable Gate Arrays (FPGAs), and/or systems including multiple processors.

HARQ Mechanism According to the Present Disclosure

Figure 4A:
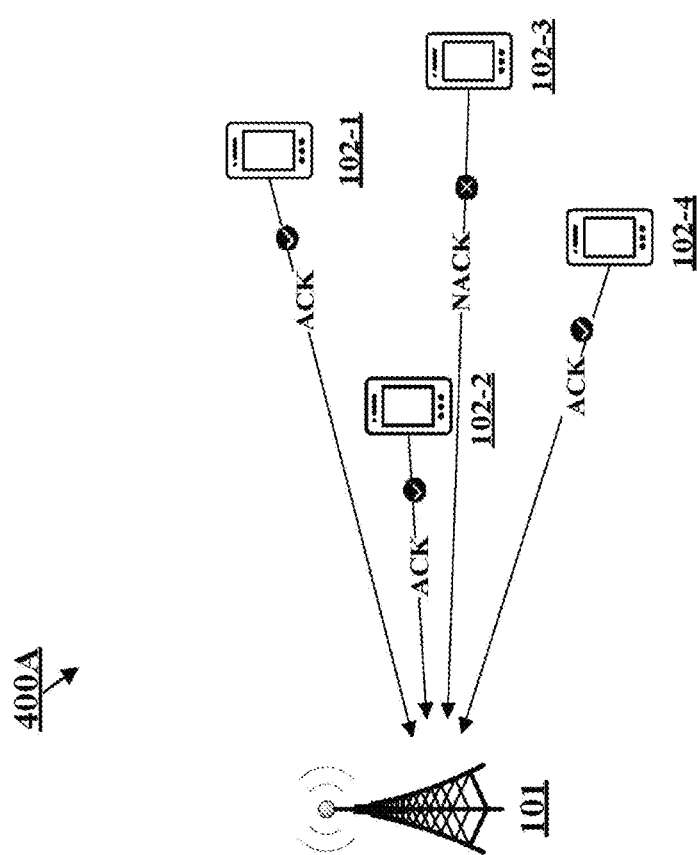
FIGS. 4A to 4B illustrate example processes of an existing HARQ mechanism and a HARQ mechanism according to an embodiment of the present disclosure.

FIG. 4A illustrates an example process of an existing HARQ mechanism. In the system 400A shown in FIG. 4, the control device 101 performs data transmissions to the terminal devices 102-1 to 102-4, and each terminal device 102-1 transmits HARQ feedback to the control device individually. Only after the control device 101 receives ACK feedback from all the terminal devices, it can allocate time slots to respective terminal devices, so that respective terminal devices can start cooperative work. The total feedback time of the existing HARQ mechanism is limited by when the control device receives HARQ feedback from the last terminal device. As an example, in 400A, the terminal devices 102-1, 102-2, and 102-4 all receive data transmission from the control device 101 correctly and send ACK feedback to the control device 101, respectively. However, channel conditions of the communication link between the terminal device 102-3 and the control device 101 are poor (such as due to blockage), so the terminal device 102-3 does not receive the data transmission from the control device 101 correctly, and send NACK feedback to the control device 101. The NACK feedback is very likely to fail to reach the control device 101 due to poor link communication quality. Thereafter, multiple data retransmissions and NACK feedback may be required between the control device 101 and the terminal device 102-3 (wherein the control device may fail to receive the NACK feedback multiple times). Even if the data transmission and ACK feedback between the terminal device 101 and the terminal device 102-3 are successful at the end, it will cause a large latency in the entire communication process. It can be seen that the existing HARQ mechanism may cause a large latency in system communication in a case that channel conditions between the control device and one or some terminal devices are poor, and delay the time for multiple terminal devices to start synchronization operation.

In order to reduce communication latency of a system and ensure more reliable transmission at the same time, the present disclosure provides a HARQ mechanism for conducting HARQ feedback in units of clusters. Specifically, after a control device transmits data to individual terminal devices, slave terminal devices in each cluster sends its own HARQ feedback to a master terminal device in its cluster, and the master terminal device combines the received HARQ feedback from the slave terminal device with its own HARQ feedback to form cluster HARQ feedback, and sends the cluster HARQ feedback to the control device. Because terminal devices in the same cluster are close in distance and have few obstacles, the communication quality of the direct link between them is higher than that of the link between the control device and the terminal devices. In a case that channel conditions between the control device and some terminal devices are poor, the HARQ feedback sent by these terminal devices often cannot be received successfully, so that the control device needs to wait quite a long time to confirm HARQ feedback from these terminal devices. According to the present disclosure, HARQ feedback information is aggregated between terminal devices through a direct link (i.e., sidelink) between devices, so that the master terminal device, which usually has good communication conditions with the control device, sends cluster HARQ feedback to the terminal devices, which helps reduce the total HARQ feedback time, thereby reducing the waiting time of a plurality of terminal devices and starting cooperative work as early as possible.

Example Process of HARQ Mechanism

Figure 4B:
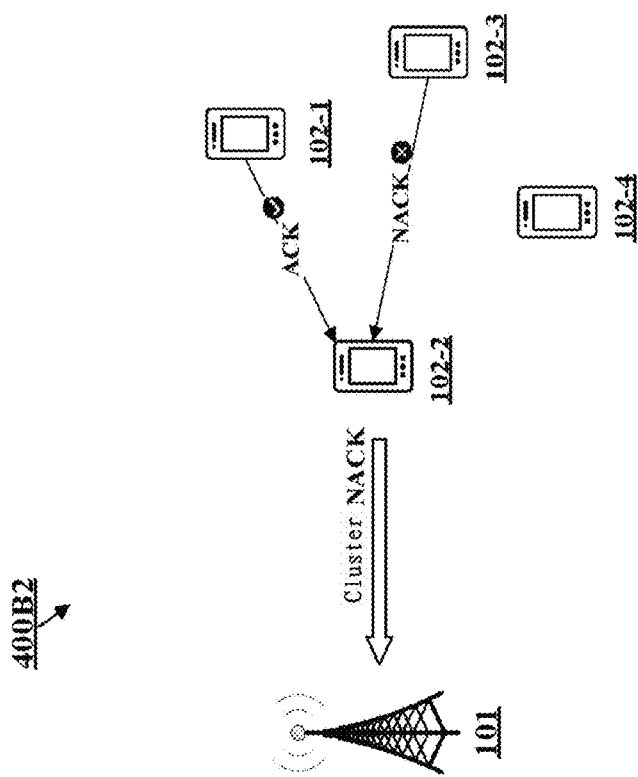
Figure 4B:
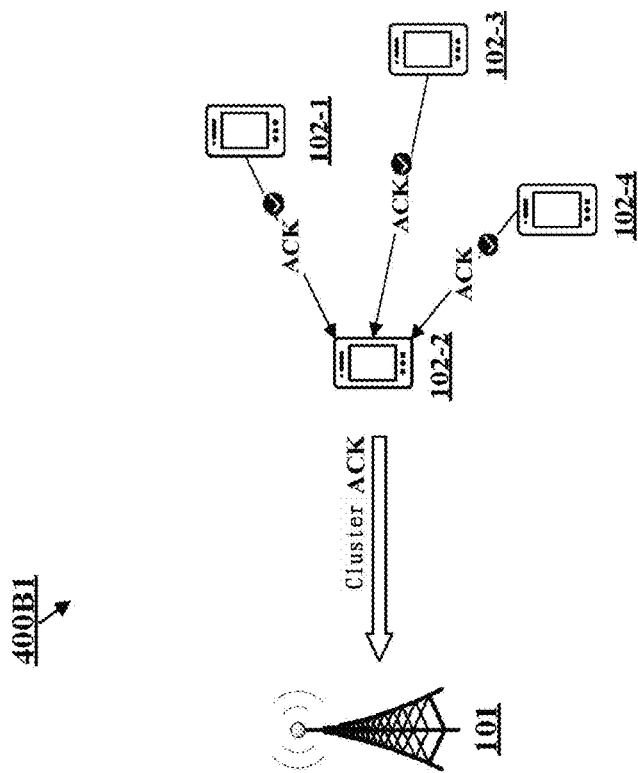

FIG. 4B illustrates an example process of a HARQ mechanism according to an embodiment of the present disclosure. In the present disclosure, a master terminal device in a cluster receives HARQ feedback from slave terminal devices in the cluster, and generates cluster HARQ feedback based on these HARQ feedback and its own HARQ feedback, and sends the cluster HARQ feedback to a control device. Specifically, HARQ feedback includes ACK feedback and NACK feedback, and cluster HARQ feedback includes cluster ACK feedback and cluster NACK feedback. 400B1 and 400B2 in FIG. 4B show an example process of feeding back cluster ACK and cluster NACK, respectively, and the example process can be executed by the above control device 101 and terminal device 102, and more specifically, can be executed by the above electronic device 200 and electronic device 300.

Similar to the scenario of FIG. 4A, FIG. 4B illustrates a cluster comprising 4 terminal devices 102-1 to 102-4, wherein 102-2 is a master terminal device, and 102-1, 102-3 and 102-4 are slave terminal devices. Generally speaking, the longest HARQ feedback waiting time (e.g., a first time period) of the master terminal device can be predefined. As an example, the longest HARQ feedback waiting time may be related to current communication service requirements, communication quality, single data transmission time, and the like.

As shown by 400B1 in FIG. 4B, each slave terminal device in the cluster receives the data from the control device 101 correctly, and each slave terminal device sends ACK feedback to the master terminal device 102-2. The master terminal device 102-2 generates cluster ACK feedback based on its own ACK feedback and the received ACK feedback from the slave terminal devices, and sends the cluster ACK feedback to the control device 101. In general, cluster HARQ feedback should be sent to the control device before the longest HARQ feedback wait time expires. Within the longest HARQ feedback waiting time, once the master terminal device 102-2 determines that HARQ feedback from each terminal device is ACK feedback, it can send cluster ACK feedback to the control device 101. The timing of sending the cluster NACK feedback will be discussed below. It should be understood that in a case that the terminal device directly decodes the received signal successfully, ACK feedback can be sent; in a case that the terminal device failed to decode the received signal previously but decode the received signal successfully after the control device has retransmitted (for example, blind retransmitted) the signal, the signal can be soft combined with previously received signal data to obtain signal correctly, and then ACK feedback is sent. Accordingly, in response to receiving the cluster ACK feedback from the master terminal device in the cluster, the control device 101 may stop data retransmission to each terminal device in the cluster.

It should be understood that as long as the master terminal device receives ACK feedback from a certain slave terminal device once, it can be considered that the slave terminal device has correctly received the data transmission from the control device, and subsequent HARQ feedback from the slave terminal device can be ignored (whether it is ACK feedback or NACK feedback).

While the master terminal device sends cluster ACK feedback to the control device, the master terminal device may send information to one or more slave terminal devices in the cluster to configure a plurality of terminal devices to perform operations in a synchronized manner. Specifically, the master terminal device may allocate a specific time slot for performing synchronization operations to one or more slave terminal devices, and send an indication signal to each slave terminal device.

As shown by 400B2 in FIG. 4B, within the longest HARQ feedback waiting time, there is a terminal device in the cluster that does not correctly receive data transmission from the control device 101. The slave terminal device that does not correctly receive data transmission from the control device may send NACK feedback to a master terminal device, or optionally not send NACK feedback. As an example, slave terminal devices 102-3 and 102-4 do not correctly receive data transmission from the control device 101, and the slave terminal device 102-3 sends NACK feedback to the master terminal device 102-2, while the slave terminal device 102-4 does not send HARQ feedback to the master terminal device 102-2 within the longest HARQ feedback waiting time. The master terminal device 102-2 generates cluster NACK feedback based on its own ACK (or NACK) feedback and received NACK feedback from slave terminal devices (and/or not receiving HARQ feedback from all or part of the slave terminal devices), and sends the cluster NACK feedback to the control device 101. If the master terminal device 102-2 cannot determine that HARQ feedback from each terminal devices is ACK feedback within the longest HARQ feedback waiting time period, the master terminal device 102-2 sends cluster NACK feedback to the control device 101 upon the longest HARQ feedback waiting time expires. During this process, the master terminal device may record identifications of terminal devices that did not receive the data transmission correctly.

In this disclosure, cluster NACK feedback may include two types: first cluster NACK feedback and second cluster NACK feedback. The first cluster NACK feedback is based on NACK feedback or no HARQ feedback from at least one terminal device in a cluster and indicates that there is a terminal device in the cluster that did not correctly receive data transmission from a control device correctly. The second cluster NACK feedback is based on NACK feedback or no HARQ feedback from at least one terminal device in a cluster and respective terminal device identification(s), and indicates, by the terminal device identification(s), terminal device(s) that did not correctly receive data transmission(s) from a control device.

Accordingly, in response to receiving cluster NACK feedback (first cluster NACK feedback or second cluster NACK feedback) from a master terminal device in a cluster, the control device 101 may perform data retransmission to terminal devices in the cluster. In one embodiment, the control device may perform data retransmission to each terminal devices in the cluster. In other words, the control device only responds to the overall HARQ situation of the cluster, and retransmits data to all terminal devices in the cluster to ensure the reliability of data transmission. In another embodiment, the control device performs data retransmissions to terminal devices in the cluster that feed back NACK or have no HARQ feedback according to the received second cluster NACK feedback. In yet another embodiment, the control device retransmits data for terminal devices that feed back NACK or have no HARQ feedback to the master terminal device in the cluster according to the received second cluster NACK feedback, so that the master terminal device forwards the data to respective terminal devices.

Generally speaking, direct links (i.e., sidelinks) between terminal devices in a cluster have short distances, less blockages, and better communication quality. By aggregating HARQ feedback in a cluster and reporting the HARQ situation of the entire cluster to a control device by a master terminal device, the control device can quickly learn the situation of each terminal device and perform data retransmission in a targeted manner. Since the master terminal device is often a terminal device that obtains better communication performance, therefore, by using it to feed back the cluster HARQ situation and even acting as a relay device to forward retransmission data, the reliability of a communication system is improved and the latency is reduced. In the existing HARQ mechanism, when channel conditions between a control device and some terminal devices are poor, it takes a long time for HARQ feedback from these terminal devices to successfully reach the control device. According to the HARQ mechanism of the present disclosure, HARQ feedback from each terminal device is aggregated to a master terminal device with good channel conditions with the control device by using direct links between terminal devices with better communication quality, and then the master terminal device reports cluster HARQ feedback to the control device, so that the total time required for HARQ feedback is shorter, thereby reducing the communication latency of the system effectively.

Cluster Division of Terminal Devices

This section will introduce cluster division of terminal devices, update of the cluster, and related signaling in detail.

A control device may perform cluster division based on one or more of the following factors: services terminal devices participate in, locations of terminal devices, capabilities of terminal devices, and channel conditions between terminal devices and the control device, among others. Based on similar factors, the control device may also update cluster division. As an example, the control device may update cluster by employing two modes, i.e. periodic update mode and aperiodic update mode, according to characteristics of services that terminal devices currently participate in. Specifically, the periodic update mode is mainly aimed at terminal devices that move slowly or is stationary (such as participate in static services), while the aperiodic update mode is mainly aimed at terminal devices that move fast (such as participate in dynamic services).

In the periodic update mode, the control device can periodically determine whether a cluster needs to be updated based on the information reported by terminal devices in the current cluster, where the information reported by the terminal devices may include communication success rates of individual terminal devices in the recent communication with the control device reported by a master terminal device, location information and functionality information reported by slave terminals, etc.

In the aperiodic update mode, a master terminal device in a cluster determines the communication quality between terminal devices in the cluster according to the received HARQ feedback from slave terminal devices. When the communication quality is poor or the type of service that a terminal device participates in changes, the master terminal device can monitor terminal devices within its service range (which may include but are not limited to terminal devices in the cluster) for communication success rate and reference signal received power, etc. in the communication with the control device, and report the monitored results to the control device. The control device can determine whether the cluster needs to be updated based on the monitored result reported by the master terminal device in the current cluster.

When the control device determines that the cluster needs to be updated (for example, when communication success rates and/or the reference signal received power of all or part of terminal devices in the cluster in the communication with the control device are lower than a predetermined threshold), it can send clustering signaling to terminal devices for updating the cluster. As an example, an example format of clustering signaling for terminal devices is listed below:

Data header: Redundant bits can be added to indicate whether there is a change between the current clustering information and the previous clustering information, and indicate whether the current mode belongs to periodic update or aperiodic update. For example, '00' can be used to indicate there is no change within a period in periodic update mode; '10' to indicate there is a change in a period in periodic update mode; '01' to indicate there is no abrupt change in aperiodic update mode (may not be commonly used); '11' to indicate there is an abrupt change in aperiodic update mode.

Cluster ID: An identifier used to identify the cluster to which the terminal device belongs. Terminal devices in the same cluster have the same cluster ID, and cluster IDs of different clusters are independent of each other. Terminal devices in a cluster can choose to execute current service of the cluster according to the cluster ID.

Master terminal device identifier: Indicates whether the current terminal device is a master terminal device. For example, '1' can be used to indicate that current terminal device is a master terminal device; '0' can be used to indicate that current terminal device is a slave terminal device.

In-cluster terminal device ID: An identifier used to identify different terminal devices in the same cluster.

Number of in-cluster terminal devices (this section may be omitted when the terminal device is a slave terminal device): This information can be used to assist the master terminal device to determine whether it has received HARQ feedback from all terminal devices.

Other information of cluster: Indicates that current service of the cluster is mobile service/non-mobile service, long-term service/short-term service, etc.

It should be understood that the above clustering signaling is not only applicable to update of cluster, but also applicable to indicate, by a control device, to terminal devices the initial division of a cluster and information such as cluster remaining unchanged. It should also be understood that when a terminal device is not divided into any cluster, its cluster ID is null (that is, it is not configured with a cluster ID), and sections such as above-mentioned master terminal device identifier, in-cluster terminal device ID, number of in-cluster terminal devices and other information of cluster are all null.

After a control device determines the division or update of a cluster, the control device may determine a master terminal device in the cluster based on a priori experience and/or reference signal power (e.g. in periodic update mode or aperiodic update mode). The prior experience usually includes information such as the influence of the master terminal device on the system performance in previous services of an observation system or current system. Specifically, prior experience may have the following two modes:

Mode 1: If a communication system similar to the current communication system previously exists, and previously selected master terminal device brings good communication performance to the communication system, then in the current communication system, a control device will select a terminal device with parameters similar to those of the above master terminal device as current master terminal device. As an example, the above parameters of the terminal device may include, but not limited to, the location, functionality, and the like of the terminal device.

Mode 2: If there is no previous communication system similar to the above or there is no master terminal device that brings good performance to the communication system, it can be considered to collect user equipment information and communication environment information in a more general communication system. Based on the information, it can be obtained which parameters have an important influence on the selection of a master terminal device and the system performance, and determined the pros and cons of the influence. Thereafter, in the current communication system, a terminal device that is beneficial to the performance of the communication system can be selected as a master terminal device according to these parameters.

It should be appreciated that selection of a master terminal device based on prior experience can be based on artificial intelligence methods (such as deep neural networks, etc.). A control device can obtain a neural network suitable for related scenarios and services by collecting and training previously obtained communication data (including service type, communication quality, distributed topology of terminal devices, clustering situation of terminal devices and other related parameters). Through the learning by artificial intelligence methods, the similarity of communication systems can be determined (as described in Mode 1), as well as which parameters of the terminal device will influence the system performance and the pros and cons of these influences can be determined (as described in Mode 2). It should also be appreciated that a suitable neural network can be obtained by training directly, so that a calculated optimal or suboptimal master terminal device can be directly obtained through the neural network after inputting the current communication parameters. In order to ensure the feasibility of the artificial intelligence method, the control device needs to continuously collect data such as parameters of the current communication system, and use corresponding data to train and update the neural network.

It should be understood that above reference signals include but not limited to Modulation Reference Signals (DMRS), Channel State Information Reference Signals (CSI-RS) and the like.

In some embodiments of the present disclosure, in order to further improve success reception rate of data signals, signals transmitted between a control device and terminal devices may also be improved, so as to facilitate signal transmissions between multiple terminal devices in a mutual aid manner. Specifically, the control device sends a combined signal to the terminal devices, the combined signal including all or part of signals for at least two terminal devices.

Combined Signal Transmission According to the Present Disclosure

Combined Signal Mode

In the present disclosure, combined signals are generated based on a predefined combined signal mode, wherein the combined signal mode indicates signals for which terminal devices are included in the combined signal, and indicates that the combined signal is divided into multiple parts and the size of each part and corresponding content of the signal. The combined signal mode will be described in detail below in conjunction with the example of the combined signal shown in FIG. 5.

It should be understood that "signals for terminal devices" and "combined signal" are relative concepts. "Signals for terminal devices" refers to signals that a control device originally intended to send to the terminal devices. In an embodiment of the present disclosure, a "combined signal" may be generated based on signals that the control device originally intends to send to multiple terminal devices, and thus the combined signal includes signals for multiple terminal devices.

Figure 5:
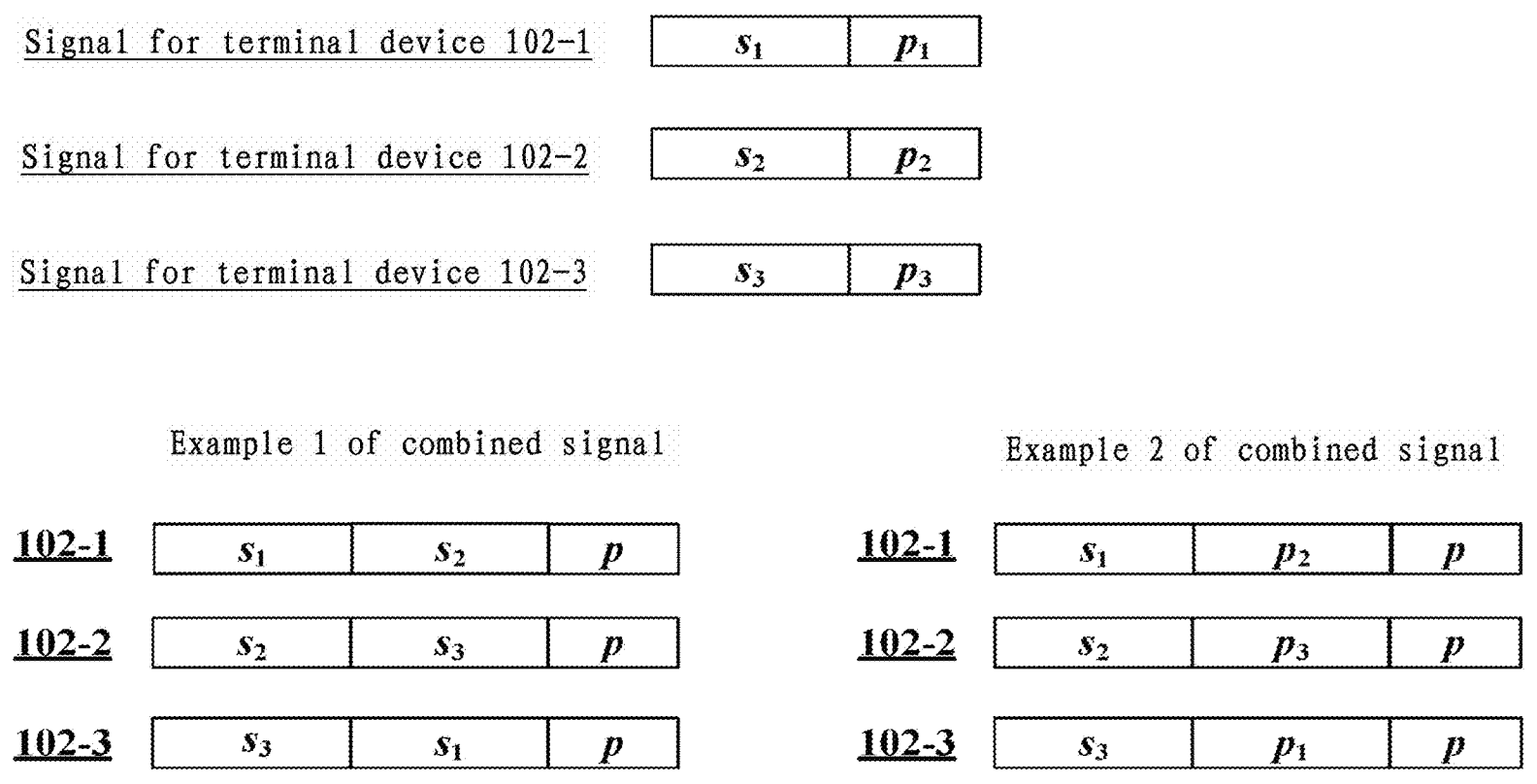

In FIG. 5, as an example, an example of signals and combined signals for three terminal devices (i.e. 102-1, 102-2 and 102-3) in a system is shown. As shown in the figure, a signals for a terminal devices may include two parts: information bits and check bits. For example, the signal for the terminal device 102-1 includes information bits $s_2$ and check bits $p_1$. The information bits carry data or information transmitted by the control device 101, and the check bits may play an error correction role during decoding, thereby improving the correctness of decoding effectively. Therefore, both of the information bits and the check bits play a key role in whether the terminal device can receive the signal correctly.

In the present disclosure, the combined signal mode may indicate the structure of the combined signal, including for which terminal devices signals are included in the combined signal, and indicate that the combined signal is divided into multiple parts and the signal content of each part. Each of the multiple parts included in the combined signal corresponds to all or part of the signal for a single terminal device, and the signal content of each part may indicate at least one of information bits or check bits. As an example, a combined signal received by a terminal device may include a portion of the signal for that terminal device (e.g., information bits/check bits), and a portion of the signal for one or more other terminal devices (e.g., information bits/check bits). More simply, the combined signal may only include a portion of the signals for two terminal devices (such as a first terminal device and a second terminal device). In this case, the structure of the combined signal has the following four possibilities:

structure 1: information bits of the first terminal device+information bits of the second terminal device;
structure 2: information bits of the first terminal device+check bits of the second terminal device;
structure 3: check bits of the first terminal device+information bits of the second terminal device;
structure 4: check bits of the first terminal device+check bits of the second terminal device.

Example 1 of the combined signal shown in FIG. 5 shows the above structure 1, and example 2 of the combined signal shows the above structure 2. For example, in the example 1 of the combined signal, the combined signal sent by the control device 101 to the terminal device 102-1 includes information bits $s_1$ of the signal for the terminal device 102-1 and information bits $s_2$ of the signal for the other terminal device 102-2. It should be noted that all or part of the signals for multiple terminal devices in the combined signal constitute the information bits of the combined signal, and the role of the check bits p of the combined signal is to perform error correction and check on the transmitted combined signal during decoding, and the check bits have no effect on subsequent signal transmission. As an example, in the example 2 of the combined signal, the check bits p of the combined signal for the terminal device 102-1 are generated for error correction of $s_1$ and $p_2$, and the check bits p of the combined signal for the terminal device 102-3 are generated for error correction of $s_3$ and $p_1$.

Additionally, the combined signal mode may also indicate the size of each of multiple parts of the combined signal. Continuing to take the example 2 of combined signal of FIG. 5 as an example, it can be defined in the combined structure mode that the information bits (such as $s_1$) of current terminal device occupy 20 bits, while the check bits (such as $p_2$) of some other terminal device occupy 15 bits. If the number of bits of respective signal does not reach the size defined above, corresponding bits may be filled with zeros.

It should be understood that the combined signal mode is usually selected by a control device, and the selection may be based on current communication system parameters, such as code rate, coding technique, etc. For example, when code rate of signals is high (e.g., higher than ⅔), the check bits have little effect on decoding. Therefore, in the combined signal, transmission of information bits rather than check bits will be selected as far as possible, so that the control device selecting the example 1 of the combined signal in FIG. 5 will be more beneficial to optimizing the performance of the communication system.

It should be appreciated that, different combinations of the above parameters affecting the combined signal mode (such as terminal devices for which signals are included in the combined signal, the size of each of multiple parts of the combined signal and corresponding signal content) and others parameters that may be involved in performance of the combined signal will produce different combined signal modes. A codebook can be used to represent multiple combined signal modes under a dedicated service or a general service (for example, numbering as combined signal mode 0, 1, 2, 3 . . . ). Parameters of the combined signal mode in the codebook remain unchanged in the current communication time period. As an example, the codebook may be represented by a two-dimensional table or a two-dimensional matrix. For example, a row in a table or matrix may include the number of one combined signal mode, the signal size and signal content of the first part, the signal size and signal content of the second part, and so on. Table 1 below illustrates an example of a codebook for combined signal mode in a scenario where a system includes 3 terminal devices, where the combined signal includes signals for two terminal devices (i.e., includes two parts). The terminal device identification may be a relative number within terminal devices (e.g., identifications of the terminal devices 102-1, 102-2, and 102-3 may be 1, 2, and 3, respectively). For ease of understanding, decimal numbers are listed in the table, but in data transmissions, binary numbers are usually used for transmissions. In the codebook, signal content can be represented by one bit, that is, '1' indicates that the signal content is information bit, and '0' indicates that the signal content is check bit. Taking the combined signal mode numbered 2 as an example, the combined signal includes check bits $p_1$ (occupying 15 bits) of the signal for the terminal device 102-1 and information bits $S_2$ (occupying 20 bits) for the terminal device 102-2. During the transmission of the combined signal, search can be done in the following table according to the number of the combined signal mode included in the signaling to obtain the structure of the respective combined signal and the specific information of each part.

TABLE 1

Codebook for combined signal mode

| Number of combined signal mode | First part | | | Second part | | |
|---|---|---|---|---|---|---|
| | Terminal device identification | Signal size (bit) | Signal content | Terminal device identification | Signal size (bit) | Signal content |
| 0 | 1 | 20 | 1 (s) | 2 | 20 | 1 (s) |
| 1 | 1 | 20 | 1 (s) | 2 | 15 | 0 (p) |
| 0 | 1 | 15 | 0 (p) | 2 | 20 | 1 (s) |
| 3 | 1 | 15 | 0 (p) | 9 | 15 | 0 (p) |
| 4 | 1 | 20 | 1 (s) | 3 | 20 | 1 (s) |
| 5 | 1 | 20 | 1 (s) | 3 | 15 | 0 (p) |
| . . . | . . . | . . . | . . . | . . . | . . . | . . . |
| N | 2 | 15 | 0 (p) | 3 | 15 | 0 (p) |

It should be understood that the size of above codebook for combined signal mode is usually large, and in order to further reduce the overhead for transmitting the codebook, the above codebook can also be split into two or more sub-codebooks to represent the combined signal mode. As an example, one sub-codebook may be used to represent for which terminal devices signals are included in the combined signal, as shown in Table 2A. Table 2A may represent a combination relationship between terminal devices in transmission of combined signals, and Table 2A may be determined upon a cluster is formed or updated. Specifically, the first row of Table 2A may indicate that the combined signal to be sent to terminal device 1 includes signal content of terminal devices 1 and 2 (denoted by '1' in the matrix), that is, terminal devices 1 and 2 have a combination relationship. Similarly, the second row of Table 2A may indicate that terminal devices 2 and 3 have a combination relationship, and the third row may indicate that terminal devices 3 and 1 have a combination relationship. Table 2A only shows combination relationship between three terminal devices, and combination relationship between more terminal devices can be similarly defined. As an example, other sub-codebooks can further be used to represent signal size and signal content of each part in the combined signal, as shown in Table 2B and Table 2C. The contents of Table 2A, Table 2B, and Table 2C may be relatively fixed for the communication system compared to what may need to be determined upon cluster formation or update. In combined signal transmissions, the specific combined signal mode can be comprehensively obtained by searching the numbers of these sub-codebooks respectively.

TABLE 2A

Codebook for combination relationship

|  | Terminal Device 1 | Terminal Device 2 | Terminal Device 3 |
|---|---|---|---|
| Terminal Device 1 | 1 | 1 | 0 |
| Terminal Device 2 | 0 | 1 | 1 |
| Terminal Device 3 | 1 | 0 | 1 |

TABLE 2B

Codebook for signal content mode

| Number of signal content mode | Signal content of the first part | Signal content of the second part |
|---|---|---|
| 0 | 1 (s) | 0 (p) |
| 1 | 1 (s) | 1 (s) |
| 2 | 0 (p) | 0 (p) |
| 3 | 0 (p) | 1 (s) |

TABLE 2C

Codebook for signal size mode

| Number of signal size mode | Signal size of the first part | Signal size of the second part |
|---|---|---|
| 0 | 20 | 20 |
| 1 | 20 | 15 |
| 2 | 15 | 20 |
| 3 | 15 | 15 |

In general, the codebook for combined signal mode needs to be informed by a control device to a terminal device before formal communication. For a short-term communication service, each time a service update occurs, if a control device needs to replace the codebook for combined signal mode, the codebook needs to be send to a terminal device in advance. Similarly, for a long-term communication service, if it is necessary to replace the codebook in the middle of the service, the control device also needs to send the new codebook for combined signal mode to respective terminal device.

Signaling Example for Combined Signal Mode

After a control device selects a combined signal mode for current communication system and service, it may inform a terminal device through a Physical Downlink Control Channel (PDCCH). A Downlink Control Information (DCI) structure has been designed by the present disclosure to indicate a combined signal mode. The present disclosure provides the following two possible DCI structures:

Modify the Modulation and Coding Scheme (MCS) part in the current DCI: Do not change the overall structure of existing DCI and do not add new bits, only modify the MCS part in the DCI structure. Current MCS rate table specifies that the MCS includes 5 bits of information, which can represent 32 modulation and coding rate conditions. As an example, since high-order modulation is generally unfavorable for realizing high-reliability and low-latency services, the parts representing high-order modulation may directly deleted, and the released parts may be used to indicate the combined signal mode. For example, '00101' in MCS, which originally referred to 64QAM, is now modified to refer to BPSK and combined signal mode 1; '00000', which originally referred to BPSK, is now modified to refer to BPSK and combined signal mode 0.

Add new elements in DCI: Do not change existing MCS structure and other information structures, but add bits in DCI, and use the newly added bits to refer to the combined signal mode. For example, two bits may be added, where '00' refers to combined signal mode 0, and bits '01' refers to combined signal mode 1, and so on.

Furthermore, the control device may also indicate the combined signal mode to terminal devices through Media Access Control (MAC) layer control elements. The size limit of the MAC layer control elements is looser than that of physical layer control signaling, so the MAC layer control elements can transmit more information than physical layer elements. Accordingly, the MAC layer control elements need to be sent to terminal devices in advance, that is, the information of the combined signal needs to be sent to terminal devices before valid signal transmissions and decoding of the physical layer.

Example Processing of Combined Signal Transmission

Figure 6:
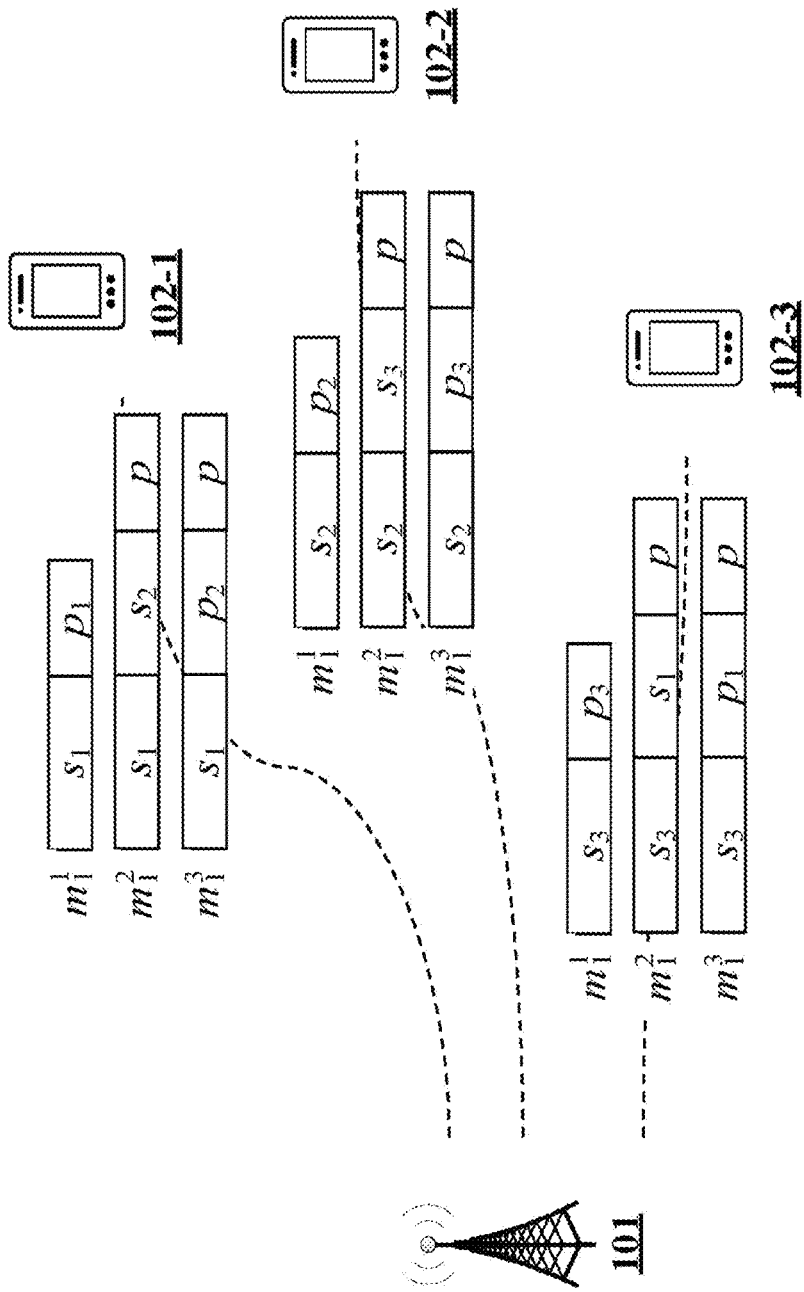
FIG. 6 illustrates a schematic diagram of a process for transmitting a combined signal according to an embodiment of the present disclosure.

Corresponding to FIG. 5, FIG. 6 illustrates an example processing for transmitting combined signals in a system including a control device 101 and three terminal devices 102-1, 102-2, and 102-3. In a communication system, the blind retransmission method can be used to improve the success rate of signal reception, that is, redundant transmission is used to increase the probability for a receiving device to correctly receive signals. In FIG. 6, as an example, a control device first sends a signal for a terminal device to the terminal device, and then transmits a combined signal in the blind retransmission stage. The signal $m_x^s$ in the figure represents the signal transmitted by the control device to a terminal device identified as x in the $z^{th}$ transmission. For example, the signal $m_1^1$ represents the signal sent by the control device 101 in the first time to the terminal device 102-1 for this individual terminal device (also referred to herein as a signal in an initial signal transmission phase); $m_1^2$ represents the signal sent by the control device 102 in the second time to the terminal device 102-1 (the combined signal in the blind retransmission phase). It should be understood that the combined signal can also be transmitted to the terminal device for the first time, but in a case of limited resources or better channel conditions, sending the signal for the terminal device in the first time may reduce overhead to a certain extent.

Figure 7:
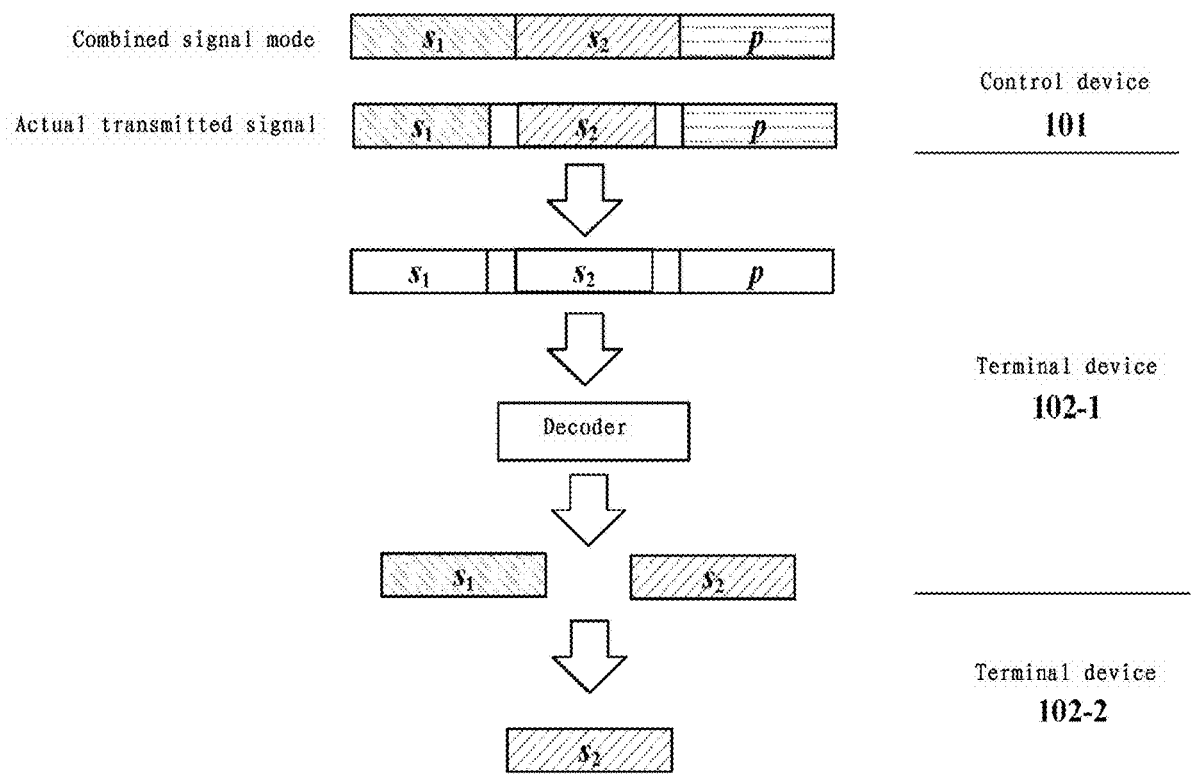
FIG. 7 illustrates a schematic diagram for decoding of a combined signal according to an embodiment of the present disclosure.

By transmitting the combined signal in the blind retransmission stage, it is possible to facilitate signal transmissions between terminal devices in a mutual aid manner. Taking the combined signal $m_1^2$ sent by the control device 101 to the terminal device 102-1 in the blind retransmission stage as an example, FIG. 7 illustrates the decoding process for the combined signal. As shown in FIG. 7, the control device 101 selects the combined signal mode and configures this information in a DCI or MAC control element. Before receiving the combined signal, the terminal device 102-1 first receives, from the control device, downlink control information DCI or MAC control element, so as to obtain indication information therefrom such as which terminal devices the combined signal are relates to and transmission scheduling information of the combined signal. On the control device 101 side, the actual transmitted signal is generated according to the combined signal mode, since the actual numbers of bits of $s_1$ and $s_2$ (as shown in the shaded parts of the actual transmitted signal in FIG. 7) are all smaller than the number of bits of respective parts defined in the combined signal mode, zero-padding is performed on those extra parts (as shown in the blank parts of the actual transmitted signal in FIG. 7). On the terminal device 102-1 side, after receiving the actual transmitted signal corresponding to the signal $m_1^2$, according to the previously received codebook for combined signal mode from the control device 101 and the control information (including the combined signal mode indicated in the DCI or MAC layer control element, which indicates the structure and composition of the combined signal (i.e., determines which bits in the combined signal are information bites/check bits for which terminal device)), the combined signal is decomposed into two signals through a decoder: $s_1$ and $s_2$. That is, terminal device 102-1 may obtain all or part of a signal for each of terminal devices 102-1 and 102-2 from the combined signal. Correspondingly, the terminal device 102-1 forwards the part of the signal that does not belong to itself (i.e., $s_2$) to respective terminal device (i.e., the terminal device 102-2) through a direct link between these devices.

Returning to FIG. 6, in a case that channel conditions between the control device 101 and the terminal device 102-1 are good (and thus the signal $m_1^1$ and the combined signal $m_1^2$ for the terminal device 102-1 are successfully received) but channel conditions between the control device 101 and the terminal device 102-2 are poor (and thus the signal $m_2^1$ and the combined signal $m_2^2$ for terminal device 102-2 are not unsuccessfully received), with the aid of the decoding process of FIG. 7, terminal device 102-1 can forward the information bits $s_2$ of the signal for the terminal device 102-2, which provides assistance to signal reception of the terminal device 102-2. Similarly, if other terminal device forwards to the terminal device 102-2 the check bits $p_2$ for it, it also facilitates increasing the success rate of signal reception of the terminal device 102-2.

Therefore, the mutual aid for data transmission for transmitting combined signals realized among multiple users may be embodied in two aspects. In one aspect, for a first terminal device among terminal devices, it can assist other terminal devices. Specifically, the control device generates a combined signal to be sent to the first terminal device based on signals for the first terminal device and for one or more other terminal devices. The combined signal includes all or part of the signal for the first terminal device and all or part of the signals for the one or more other terminal devices, and the first terminal device may forward all or part of the signals for the one or more other terminal devices to respective terminal device(s). In another aspect, the first terminal device among the terminal devices can accept aid from other terminal devices. Specifically, the control device generates a combined signal to be sent to the second terminal device based on a signal for the first terminal device and a signal for the second terminal device. The combined signal includes all or part of the signal for the first terminal device and all or part of the signal for the second terminal device, and the second terminal device may forward all or part of the signal for the first terminal device to the first terminal device.

It should be noted that the terminal device may directly forward the relevant information after successfully decoding the combined signal, and does not necessarily need to know the signal reception status of other terminal devices. If a terminal device has previously successfully received or decoded a signal for itself, it may not process signals forwarded from other terminal devices when receiving the signals. If a terminal device has not previously successfully received or decoded a signal for itself, when it receives signals forwarded from other terminal devices, it may perform soft combination on these signals with forwarded signals previously received from other terminal devices or a single signal received from the control device to correctly decode and obtain the signal for itself. In addition, if the terminal device fails to decode the combined signal, it will do nothing to signals for other terminal devices in the combined signal, that is, the terminal device will not forward respective signals, but continue to wait for a signal from the control device or signal(s) forwarded from other terminal device(s).

It should be understood that the transmission of the combined signal in the present disclosure may be performed in a cluster of terminal devices, or may not be limited to a cluster (e.g., performed between multiple terminal devices having direct links).

Combination of HARQ Mechanism and Combined Signal Transmission According to the Present Disclosure It should be appreciated that the HARQ mechanism and combined signal transmission proposed in the present disclosure may be performed independently or in combination. Specific operations of combination scheme of the two schemes will be described in detail below.

Figure 8A:
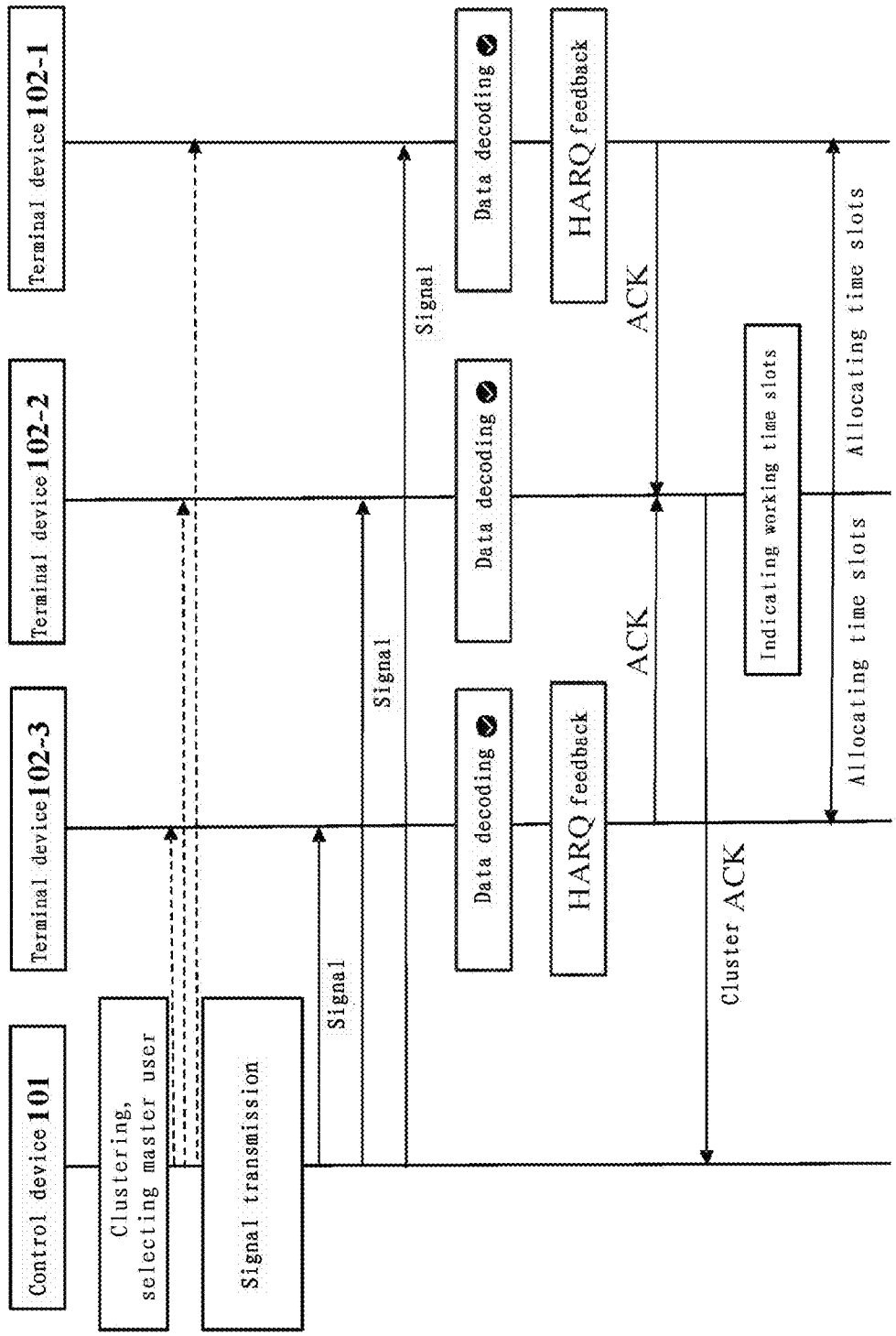
FIGS. 8A to 8C illustrate a communication interaction diagram combining a HARQ mechanism with transmission of a combined signal according to an embodiment of the present disclosure.
Figure 8B:
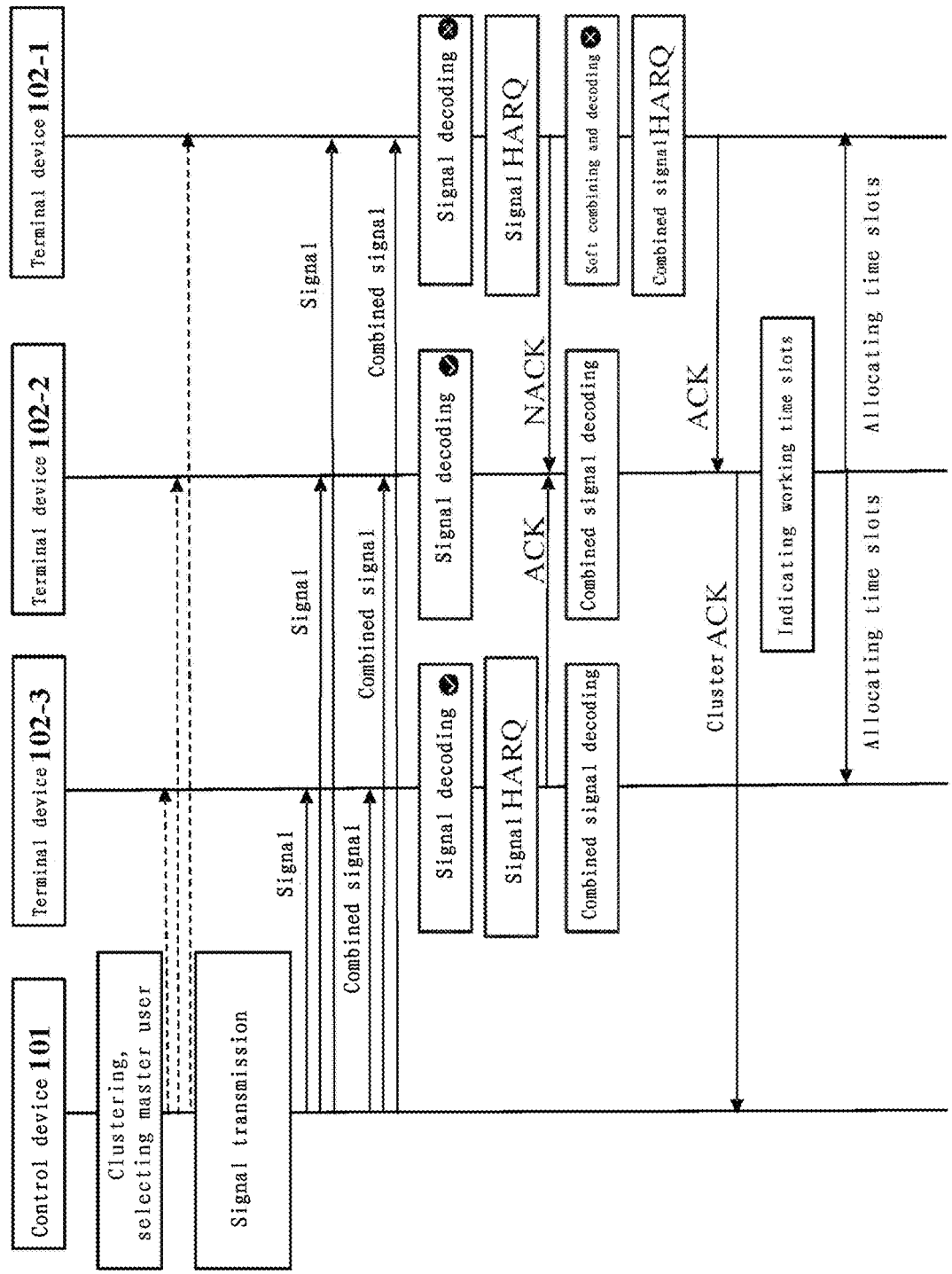
Figure 8C:
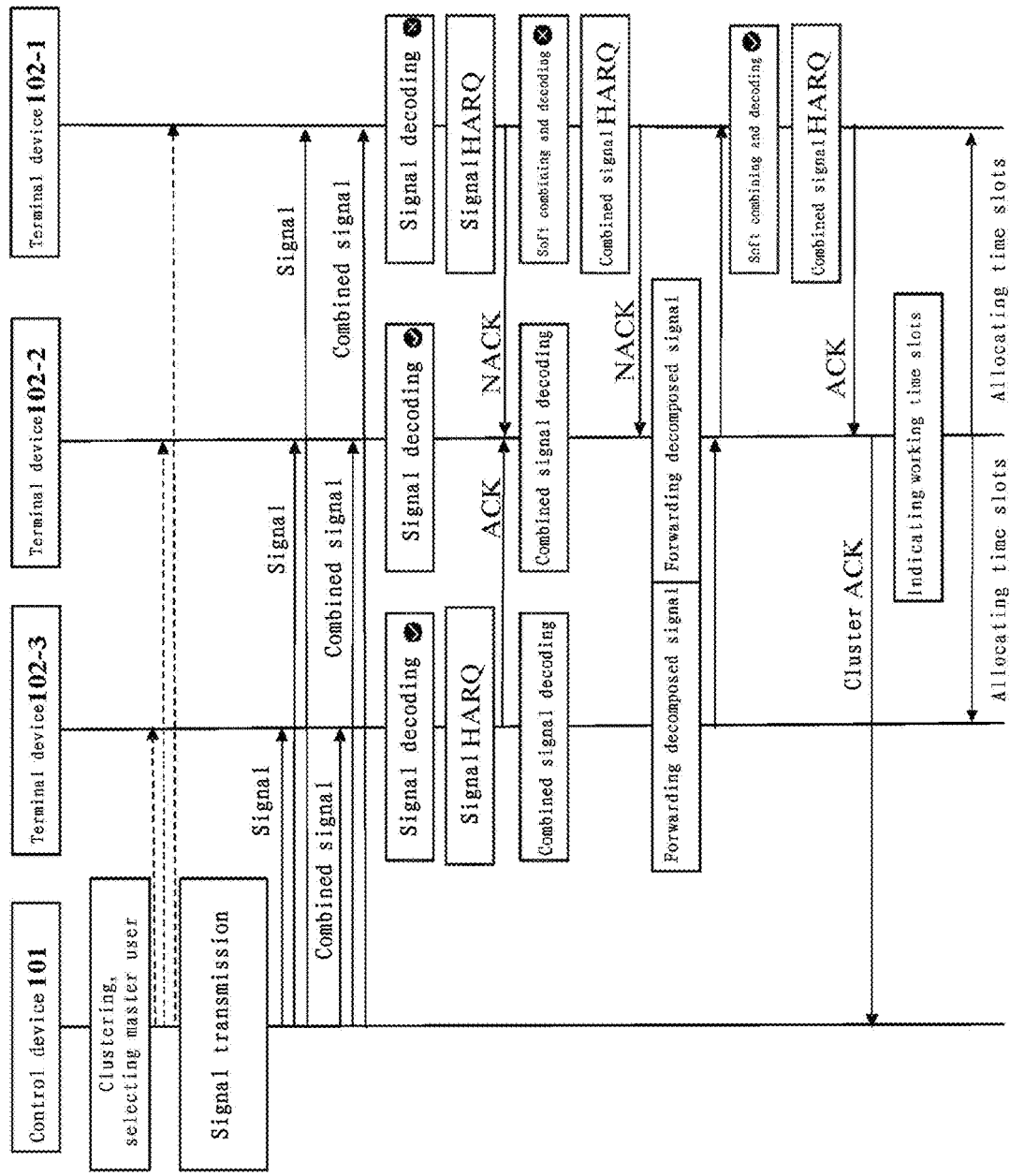

FIGS. 8A-8C illustrate a communication interaction diagram combining a HARQ mechanism with combined signal transmission according to an embodiment of the present disclosure. Specifically, FIG. 8A, FIG. 8B and FIG. 8C illustrate communication interaction diagrams of terminal devices in a system decoding successfully in an initial signal transmission stage, decoding successfully directly in a combined signal transmission stage, and decoding successfully with the aid of signals forwarded by other terminal devices in a combined signal transmission stage, respectively.

Under the combined scheme of the HARQ mechanism and combined signal transmission according to the present disclosure, the control device 101 first collects information of terminal devices (such as the above mentioned services that the terminal devices participate in, locations of the terminal devices, functions of the terminal devices, channel conditions between the terminal devices and the control device, etc.), and divide the terminal devices into one or more clusters based on the collected information, and chooses master terminal devices and slave terminal devices in the clusters. As an example, FIG. 8A-FIG. 8C illustrate the control device 101 and three terminal devices 102-1, 102-2 and 102-3 in a cluster, wherein the terminal device 102-2 is the master terminal device in the cluster, and the terminal devices 102-1 and 102-3 are slave terminal devices.

Next, the control device sends data signals to individual terminal devices in the cluster. In addition, a combined signal mode is indicated in the DCI or MAC layer control element sent by the control device to each terminal device in the cluster. A terminal device decodes a signal when it receives the signal from the control device. However, constrained by signal conditions between the control device and the terminal device, decoding may not always succeed. The three cases shown in FIGS. 8A-8C will be described below, respectively.

As shown in FIG. 8A, after the control device 101 sends a signal for a single terminal device to individual terminal devices for the first time, the terminal devices 102-1 to 102-3 can directly successfully decode to obtain related data signals. Thereafter, the slave terminal devices 102-1 and 102-3 in the cluster send ACK feedback to the master terminal device 102-2. The master terminal device 102-2 generates cluster ACK feedback according to its own ACK feedback and the received ACK feedback, and transmits the cluster ACK feedback to the control device 101. At the same time, the master terminal device 102-2 allocates working time slots to the slave terminal devices in the cluster to realize cooperative operation.

As shown in FIG. 8B, after the control device 101 sends a signal for a single terminal device to each terminal device for the first time, the master terminal device 102-2 and the slave terminal device 102-3 in the cluster directly successfully decode to the signal sent for the first time, thereby generating ACK feedback. However, the terminal device 102-1 did not successfully decode the signal sent for the first time, and thus feeds back a NACK to the master terminal device 102-2. Nevertheless, the terminal device 102-1 successfully decodes the combined signal received from the control device 101 in the blind retransmission stage, so it can perform soft combining and decoding based on the decomposed signal belonging to itself in the current combined signal and the previously received signal, thereby successfully obtaining the signal for itself. Then, the slave terminal device 102-1 sends ACK feedback to the master terminal device 102-2, so that the master terminal device generates cluster ACK feedback, and sends the cluster ACK feedback to the control device 101. At the same time, the master terminal device 102-2 allocates working time slots to the slave terminal devices in the cluster to realize cooperative operation.

As shown in FIG. 8C, similar to FIG. 8B, the master terminal device 102-2 and the slave terminal device 102-3 in the cluster directly successfully decode after receiving the signal sent for the first time from the control device 101, thereby generating ACK feedback. On the contrary, the terminal device 102-1 not only fails to decode the signal sent for the first time, but also fails in the soft combining and decoding of the combined signal subsequently sent by the control device and the signal sent for the first time. Therefore, the terminal device 102-1 waits for other terminal devices in the cluster to forward their own decomposed signals for the terminal device 102-1. Based on signals forwarded by other terminal devices and previously received signals, the terminal device 102-1 performs soft combining and decoding successfully. Next, the terminal device 102-1 sends ACK feedback to the master terminal device 102-2, so that the master terminal device generates cluster ACK feedback, and sends the cluster ACK feedback to the control device 101. At the same time, the master terminal device 102-2 allocates working time slots to the slave terminal devices in the cluster to realize cooperative operation.

It should be understood that, for more detailed example operations of the HARQ mechanism and combined signal transmission according to the present disclosure, reference can be made to operation descriptions hereinabove for these two schemes, which will not be repeated here.

It can be seen that, by transmitting combined signals through blind retransmission stage, success rate of a terminal device receiving data signals from a control device is greatly improved. In connection with the aid of the HARQ mechanism according to the present disclosure, data transmissions between multiple terminal devices in a cluster can be facilitated in a mutual aid manner, avoiding frequent HARQ feedback and retransmission operations between the terminal devices and the control device. Due to a direct links between terminal devices being added for data transmissions, data may be transmitted efficiently and reliably even in the case of poor channel conditions between the control device and certain terminal devices, which greatly reduces latency of the entire communication system, and achieves fast time alignment of multiple target terminal devices in collaborative communication, thereby significantly improving user experience.

As an example, the HARQ mechanism and combined signal transmission method proposed in the present disclosure possess substantial advantages in Ultra-Reliable Low Latency Communications (URLLC) service. In URLLC services such as remote surgery and remote games, the requirements for cooperative operation are very high, that is, in order to ensure high accuracy of the entire system, each terminal device needs to perform different tasks in the same time slot. The high efficiency HARQ mechanism proposed in the present disclosure along with the combined signal transmission scheme in the blind retransmission stage can promote signal transmission among various terminal devices in a mutual aid manner, whether individually or in combination, and can greatly reduce communication latency while ensuring high reliability of data transmission, so that each terminal device can achieve time alignment in the shortest possible time, thereby enabling cooperative work.

Exemplary Methods

Figure 9A:
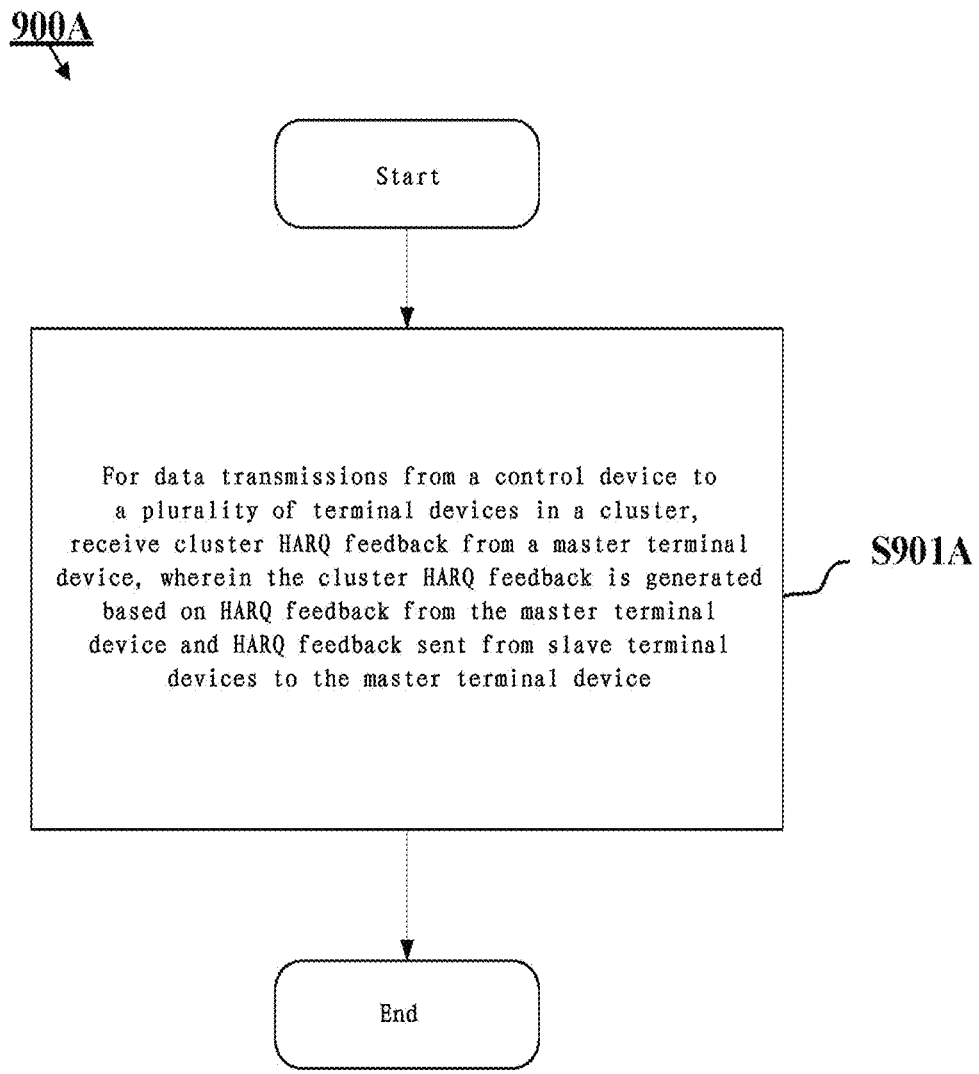
FIGS. 9A to 9C illustrate flowcharts of example methods of HARQ mechanisms according to embodiments of the present disclosure.
Figure 9B:
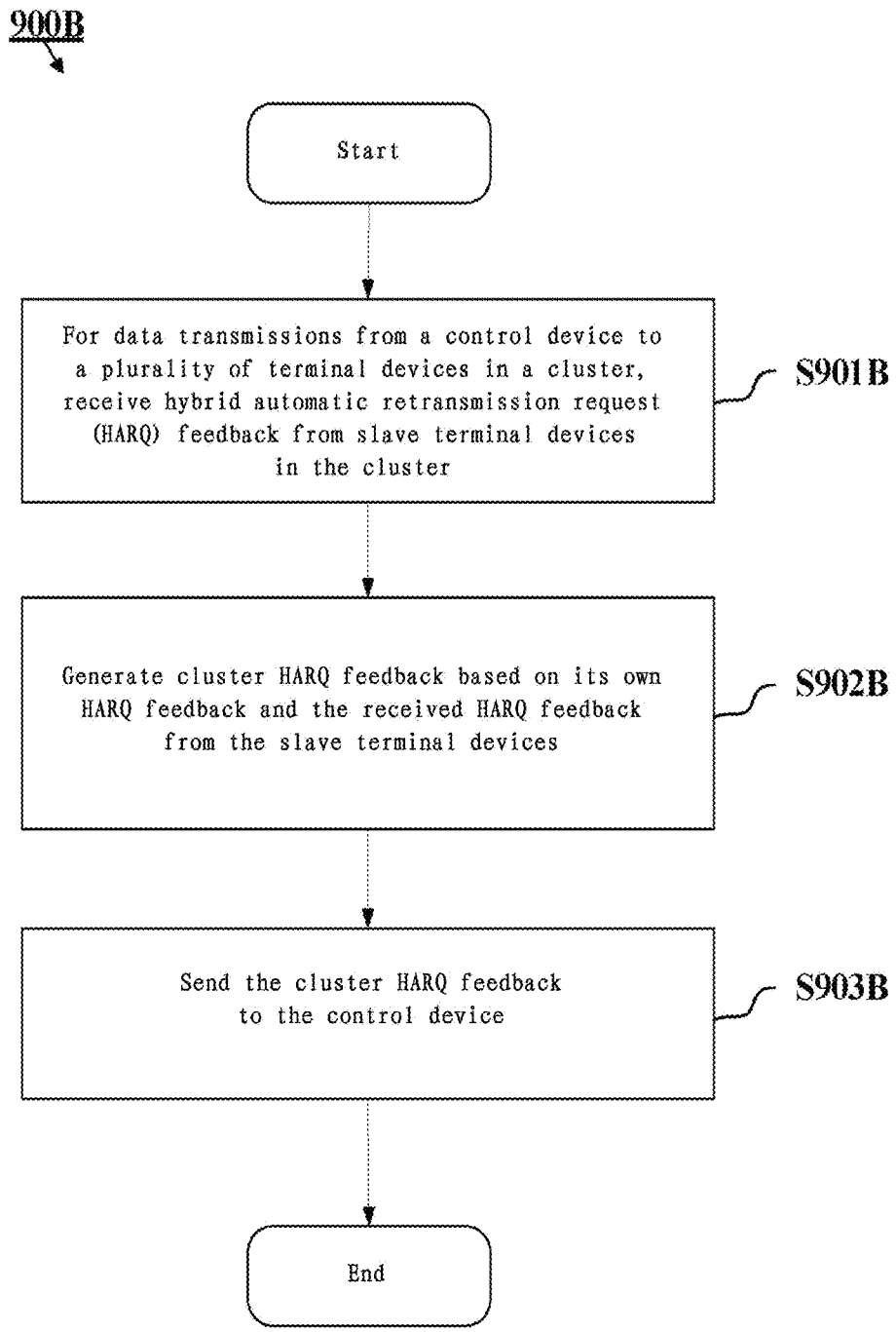
Figure 9C:
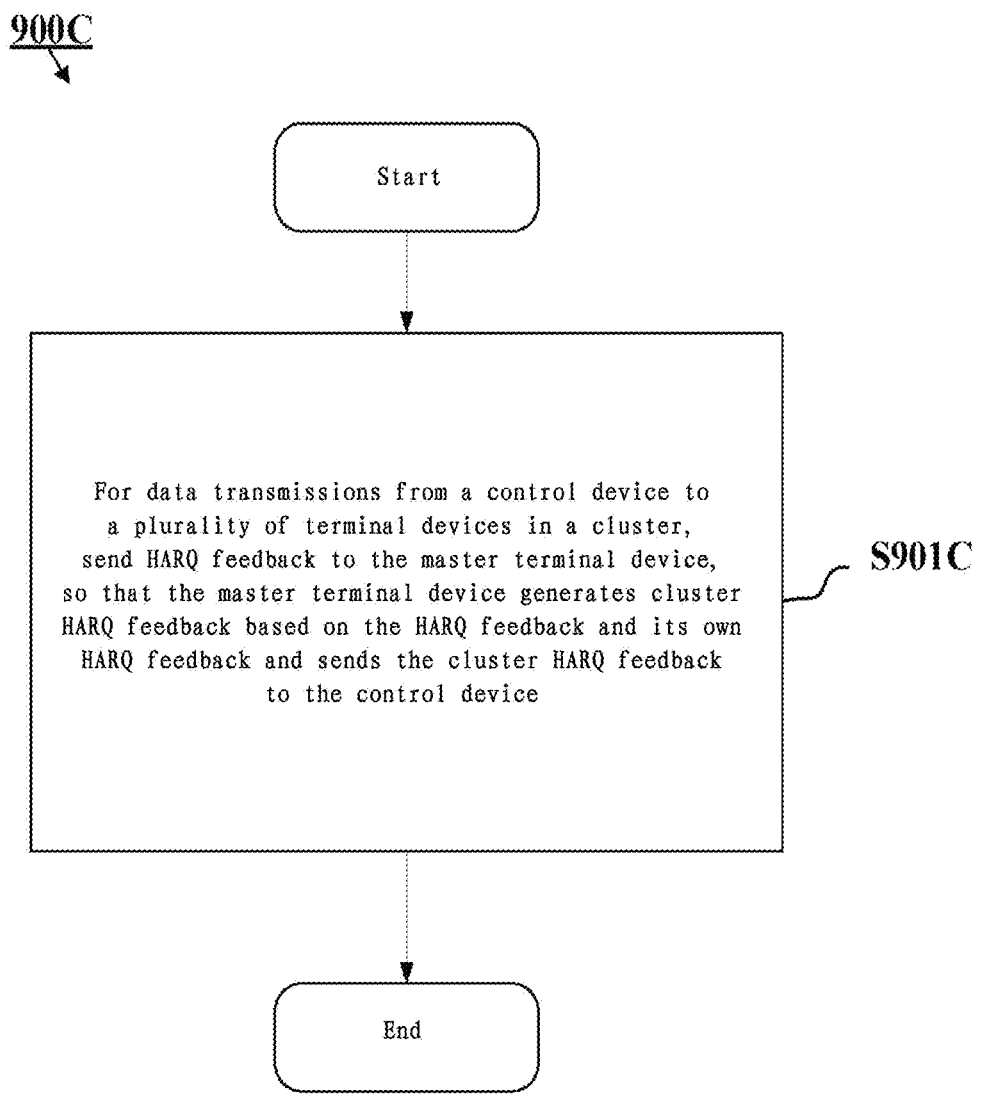

FIGS. 9A-9C illustrate flowcharts of example methods of HARQ mechanisms in accordance with embodiments of the present disclosure. Firstly, FIG. 9A illustrates an example method 900A for a control device according to the HARQ mechanism of the present disclosure. The method may be performed by the control device 101 (or more specifically, the electronic device 200) in the system 100. As shown in FIG. 9A, the method 900A may include receiving cluster HARQ feedback from a master terminal device for data transmissions from a control device to a plurality of terminal devices in a cluster, wherein the cluster HARQ feedback is generated based on HARQ feedback from the master terminal device and HARQ feedback sent from slave terminal devices to the master terminal device (block S901A). For detailed example operations of the method, reference may be made to operation descriptions hereinabove for the control device 101 (or more specifically, the electronic device 200), which will not be repeated here.

Secondly, FIG. 9B illustrates an example method 900B for a master terminal device in a cluster according to HARQ mechanism of the present disclosure, and FIG. 9C illustrates an example method 900C for a slave terminal device in a cluster according to HARQ mechanism of the present disclosure. Both methods may be performed by the terminal device 102 (or more specifically, the electronic device 300) in the system 100. As shown in FIG. 9B, method 900B includes, for data transmissions from a control device to a plurality of terminal devices in a cluster: (a master terminal device in the cluster or its electronic device) receiving hybrid automatic retransmission request (HARQ) feedback from slave terminal devices in the cluster (block S901B); generating cluster HARQ feedback based on its own HARQ feedback and the received HARQ feedback from the slave terminal devices (block S902B); and sending the cluster HARQ feedback to the control device (block S903B). As shown in FIG. 9C, the method 900C includes, for data transmissions from a control device to a plurality of terminal devices in a cluster, (a slave terminal device in the cluster or its electronic device) sending HARQ feedback to the master terminal device, so that the master terminal device generates cluster HARQ feedback based on the HARQ feedback and its own HARQ feedback, and sends the cluster HARQ feedback to the control device (block S901C). For detailed example operations of these methods, reference may be made to operation descriptions hereinabove for the terminal device 102 (or more specifically, the electronic device 300), which will not be repeated here.

Figure 10A:
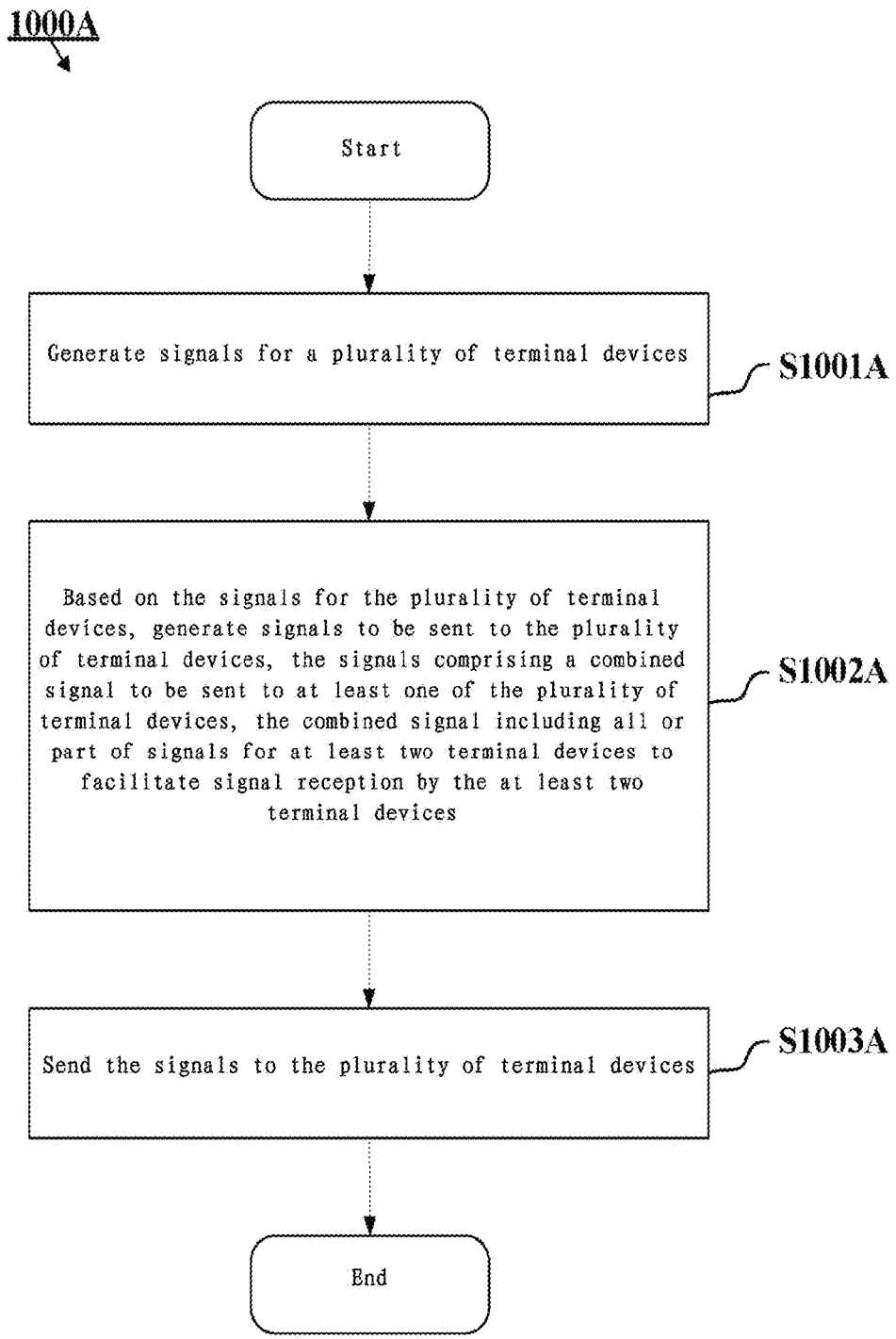
FIGS. 10A to 10B illustrate flowcharts of example methods of transmitting combined signals according to embodiments of the present disclosure.
Figure 10B:
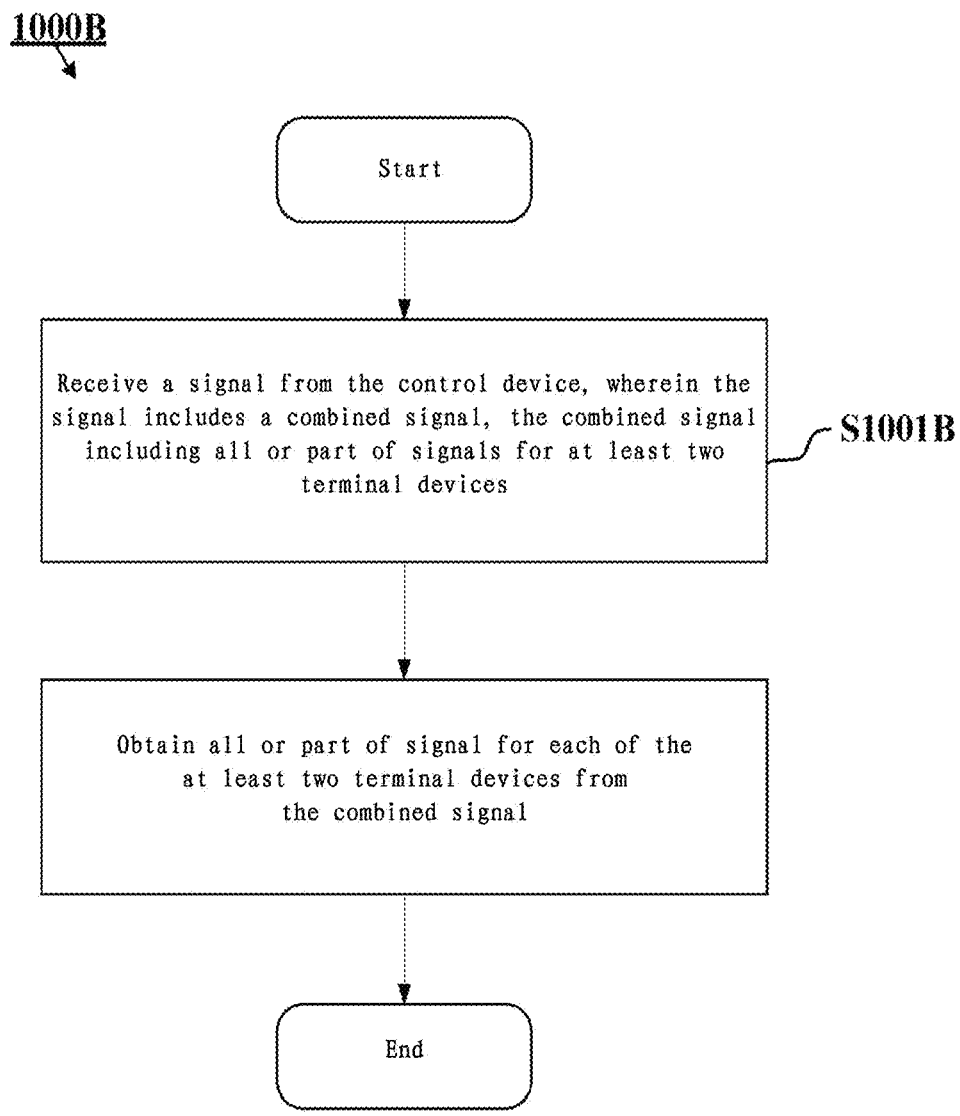

FIGS. 10A-10B illustrate flowcharts of example methods of transmitting combined signals according to embodiments of the present disclosure. Firstly, FIG. 10A illustrates an example method 1000A for a control device for transmitting a combined signal. The method may be performed by a control device 101 (or more specifically, the electronic device 200) in a system 100. As shown in FIG. 10A, the method 1000A may include generating signals for a plurality of terminal devices (block S1001A); based on the signals for the plurality of terminal devices, generating signals to be sent to the plurality of terminal devices, the signals comprising a combined signal to be sent to at least one of the plurality of terminal devices, the combined signal including all or part of signals for at least two terminal devices to facilitate signal reception by the at least two terminal devices (block S1002A); and sending the signals to the plurality of terminal devices (block S1003A). For detailed example operations of the method, reference may be made to operation descriptions hereinabove for the control device 10 (or more specifically, the electronic device 200), which will not be repeated here.

Secondly, FIG. 10B illustrates an example method 1000B for a terminal device for transmitting a combined signal. The method may be performed by a terminal device 102 (or more specifically, the electronic device 300) in a system 100. As shown in FIG. 10B, the method 1000B may include receiving a signal from the control device, wherein the signal includes a combined signal, the combined signal including all or part of signals for at least two terminal devices (block S1001B); and obtaining all or part of signal for each of the at least two terminal devices from the combined signal (block S1002B). For detailed example operations of the method, reference may be made to operation descriptions hereinabove for the terminal device 102 (or more specifically, the electronic device 300), which will not be repeated here.

Aspects of the present disclosure may be implemented in the following exemplary ways.

Clause 1. An electronic device for a control device in communication with a plurality of terminal devices, the electronic device comprising a processing circuit configured to:
generate signals for the plurality of terminal devices;
generate signals to be sent to the plurality of terminal devices based on the signals for the plurality of terminal devices, the signals comprising a combined signal to be sent to at least one of the plurality of terminal devices, the combined signal including all or part of signals for at least two terminal devices to facilitate signal reception by the at least two terminal devices; and
send the signals to the plurality of terminal devices.

Clause 2. The electronic device of Clause 1, wherein generating a combined signal comprises:
generating a combined signal to be sent to a first terminal device based on signals for the first terminal device and one or more other terminal devices of the at least one terminal device, wherein the combined signal includes all or part of a signal for the first terminal device and all or part of signals for the one or more other terminal devices, and the all or part of signals for the one or more other terminal devices will be forwarded by the first terminal device to respective terminal devices.

Clause 3. The electronic device of Clause 2, wherein generating a combined signal comprises:
generating a combined signal to be sent to a second terminal device based at least on a signal for the first terminal device and a signal for the second terminal device, wherein the combined signal includes all or part of the signal for the first terminal device and all or part of the signal for the second terminal device, and the all or part of the signal for the first terminal device will be forwarded by the second terminal device to the first terminal device.

Clause 4. The electronic device of Clause 1, wherein the combined signal is generated based on a predefined combined signal mode, the combined signal mode indicating signals for which terminal devices are included in the combined signal, and indicating the combined signal is divided into multiple parts and size and corresponding signal content of each part.

Clause 5. The electronic device of Clause 4, wherein the combined signal mode is represented by a codebook.

Clause 6. The electronic device of Clause 4, wherein each of the multiple parts of the combined signal corresponds to all or part of a signal for a single terminal device, the signal content of each part indicating at least one of information bits or check bits.

Clause 7. The electronic device of Clause 4, wherein the combined signal mode is indicated to the terminal device by downlink control information DCI or a MAC layer control element.

Clause 8. The electronic device of Clause 3, wherein the combined signal is sent during a blind retransmission.

Clause 9. The electronic device of Clause 1, wherein the plurality of terminal devices are divided into a cluster, the plurality of terminal devices including a master terminal device and one or more slave terminal devices, and the processing circuit is further configured to:
for transmissions of signals, receive cluster hybrid automatic repeat request (HARQ) feedback from the master terminal device, the cluster HARQ feedback being based on HARQ feedback from the plurality of terminal devices in the cluster.

Clause 10. The electronic device of 9, wherein the cluster HARQ feedback comprises at least one of:
cluster ACK feedback, which is generated based on ACK feedback from the plurality of terminal devices, and indicates that each terminal device in the cluster correctly received a signal for itself;
first cluster NACK feedback, which is generated based on NACK feedback from at least one terminal device or no HARQ feedback from at least one slave terminal device, and indicates that there is a terminal device in the cluster that did not correctly receive a signal for itself; or
second cluster NACK feedback, which is generated based on NACK feedback from at least one terminal device or no HARQ feedback from at least one slave terminal device and respective one or more terminal device identifications, and indicates one or more terminal devices in the cluster that did not correctly receive signals for themselves by the one or more terminal device identifications.

Clause 11. The electronic device of Clause 9, wherein the processing circuit is further configured to:
divide or update clusters based on one or more of: services the terminal devices participate in, locations of the terminal devices, functionalities of the terminal devices, or channel conditions between the terminal devices and the control device.

Clause 12. The electronic device of Clause 9, wherein the processing circuit is further configured to:
determine the master terminal device in the cluster based on priori experience and/or reference signal power through artificial intelligence methods.

Clause 13. The electronic device of Clause 3, wherein:
communication between the control device and the plurality of terminal devices is conducted via one of a cellular link, a wireless local area network (WLAN) link, or a vehicle-to-vehicle (V2V) link, and communication between the plurality of terminal devices is conducted via a direct link between devices.

Clause 14. The electronic device of Clause 1, wherein the signal is a signal transmitted in an Ultra-Reliable low-latency communication (URLLC).

Clause 15. An electronic device for a terminal device, the electronic device comprising a processing circuit configured to:
receive a signal from a control device, wherein the signal comprises a combined signal including all or part of signals for at least two terminal devices; and
obtain all or part of signal for each of the at least two terminal devices from the combined signal.

Clause 16. The electronic device of Clause 15, wherein the processing circuit is further configured to:
receive a combined signal including all or part of the signal for the terminal device and all or part of signals for one or more other terminal devices; and
forward all or part of the signals for the one or more other terminal devices to respective terminal devices.

Clause 17. The electronic device of Clause 16, wherein the processing circuit is further configured to:
receive all or part of the signal for the terminal device from at least one terminal device, wherein the all or part of the signal for the terminal device is included in the combined signal received by the at least one terminal device.

Clause 18. The electronic device of Clause 15, wherein the combined signal is generated based on a predefined combined signal mode, the combined signal mode indicating signals for which terminal devices are included in the combined signal, and indicating the combined signal is divided into multiple parts and size and corresponding signal content of each part.

Clause 19. The electronic device of Clause 18, wherein the combined signal mode is represented by a codebook.

Clause 20. The electronic device of Clause 18, wherein each of the multiple parts of the combined signal corresponds to all or part of a signal for a single terminal device, the signal content of each part indicating at least one of information bits or check bits.

Clause 21. The electronic device of Clause 17, wherein the combined signal is received during a blind retransmission.

Clause 22. The electronic device of Clause 15, wherein the terminal device and one or more other terminal devices are divided into a cluster, which comprises a master terminal device and one or more slave terminal devices, and the processing circuit is further configured to:
in a case that the terminal device is the master terminal device in the cluster, receive, from one or more slave terminal devices in the cluster, hybrid automatic repeat request (HARQ) feedback from the one or more slave terminal device on receiving signals for itself, and send cluster HARQ feedback to the control device based on the HARQ feedback and its own HARQ feedback; or
in a case that the terminal device is the slave terminal device in the cluster, send HARQ feedback on receiving signal for itself to the master terminal device in the cluster, so that the master terminal device sends cluster HARQ feedback to the control device based on the HARQ feedback and HARQ feedback from the master terminal device.

Clause 23. The electronic device of Clause 15, wherein:
communication between the control device and the terminal device is conducted via one of a cellular link, a wireless local area network (WLAN) link, or a vehicle-to-vehicle (V2V) link, and communication between the terminal device and other terminal devices is conducted via a direct link between devices.

Clause 24. The electronic device of Clause 15, wherein the control device is a base station, and the processing circuit is further configured to:
receive downlink control information from the base station prior to receiving the signal, the downlink control information including scheduling information for the transmission of the combined signal and information indicating which terminal devices are involved in the combined signal, and
decode signals for at least two terminal devices included in the combined signal according to the downlink control information.

Clause 25. An electronic device for a control device in communication with a plurality of terminal devices in a cluster, the plurality of terminal devices comprising a master terminal device and one or more slave terminal devices, the electronic device comprising a processing circuit configured to:
for data transmissions from the control device to the plurality of terminal devices in the cluster, receive cluster hybrid automatic repeat request (HARQ) feedback from the master terminal device, wherein the cluster HARQ feedback is generated based on HARQ feedback from the master terminal device and HARQ feedback sent from the slave terminal devices to the master terminal device.

Clause 26. The electronic device of 25, wherein the HARQ feedback comprises ACK feedback and NACK feedback, and the cluster HARQ feedback comprises one of:
  cluster ACK feedback, which is based on ACK feedback from each terminal device in the cluster, and indicates that each terminal device in the cluster correctly received data transmission from the control device;
  first cluster NACK feedback, which is based on NACK feedback from at least one terminal device in the cluster or no HARQ feedback, and indicates that there is a terminal device in the cluster that did not correctly receive data transmission from the control device; or
  second cluster NACK feedback, which is based on NACK feedback from at least one terminal device in the cluster or no HARQ feedback and respective one or more terminal device identifications, and indicates one or more terminal devices that did not correctly receive data transmissions from the control device by the one or more terminal device identifications.

Clause 27. The electronic device of Clause 26, wherein the processing circuit is further configured to:
  in response to receiving the cluster ACK feedback from the master terminal device in the cluster, cease data retransmission to each terminal device in the cluster; or
  in response to receiving the first cluster NACK feedback or the second cluster NACK feedback from the master terminal device in the cluster, perform at least one of:
    data retransmission to each terminal device in the cluster;
    data retransmission to terminal devices in the cluster that send NACK feedback or have no HARQ feedback; and
    retransmission, to the master terminal device in the cluster, data for terminal devices that send NACK feedback or have no HARQ feedback, so that the master terminal device forwards the data to respective terminal devices.

Clause 28. The electronic device of Clause 25, wherein the processing circuit is further configured to:
  divide or update clusters based on one or more of: services the terminal devices participate in, locations of the terminal devices, functionalities of the terminal devices, or channel conditions between the terminal devices and the control device.

Clause 29. The electronic device of Clause 25, wherein the processing circuit is further configured to:
  determine the master terminal device in the cluster based on priori experience and/or reference signal power through artificial intelligence methods.

Clause 30. The electronic device of Clause 25, wherein the processing circuit is further configured to:
  send a signal to at least one terminal device in the cluster, wherein the signal comprises a combined signal, and the combined signal includes all or part of signals for at least two terminal devices to facilitate signal reception by the at least two terminal devices.

Clause 31. The electronic device of Clause 25, wherein: communication between the control device and the terminal devices is conducted via one of a cellular link, a wireless local area network (WLAN) link, or a vehicle-to-vehicle (V2V) link, and communication between the terminal devices in the cluster is conducted via a direct link between devices.

Clause 32. The electronic device of Clause 25, wherein the data transmission is a data transmission in Ultra-Reliable Low Latency Communication (URLLC).

Clause 33. An electronic device for a terminal device, the terminal device being a master terminal device in a cluster, and the cluster further comprising one or more slave terminal devices, the electronic device comprising a processing circuit configured to:
  for data transmissions from a control device to a plurality of terminal devices in the cluster:
    receive hybrid automatic repeat request (HARQ) feedback from slave terminal devices in the cluster;
    generate cluster HARQ feedback based on its own HARQ feedback and the received HARQ feedback from the slave terminal devices; and
    send the cluster HARQ feedback to the control device.

Clause 34. The electronic device of 33, wherein the HARQ feedback comprises ACK feedback and NACK feedback, and the generating cluster HARQ feedback comprises one of:
  generating cluster ACK feedback based on ACK feedback from each terminal device in the cluster, the cluster ACK feedback indicating that each terminal device in the cluster correctly received data transmission from the control device;
  generating first cluster NACK feedback based on NACK feedback from at least one terminal device in the cluster or no HARQ feedback, the first cluster NACK feedback indicating that there is a terminal device in the cluster that did not correctly receive data transmission from the control device; or
  generating second cluster NACK feedback based on NACK feedback from at least one terminal device in the cluster or no HARQ feedback and respective one or more terminal device identifications, the second cluster NACK feedback indicating one or more terminal devices that did not correctly receive data transmissions from the control device by the one or more terminal device identifications.

Clause 35. The electronic device of Clause 34, wherein the cluster HARQ feedback corresponds to HARQ feedback from each terminal device in the cluster within a first time period, and the processing circuit is further configured to:
  within the first time period, once the HARQ feedback from each terminal device being determined to be ACK feedback, send the cluster ACK feedback to the control device; otherwise,
  upon expiration of the first time period, send the cluster NACK feedback to the control device.

Clause 36. The electronic device of Clause 34, wherein the processing circuit is further configured to:
  once the cluster ACK feedback being sent to the control device, send information to one or more slave terminal devices in the cluster to configure the time when a plurality of terminal devices perform synchronization operation.

Clause 37. The electronic device of Clause 33, wherein the processing circuit is further configured to:
receive a signal from the control device, wherein the signal comprises a combined signal including all or part of signals for at least two terminal devices; and
obtain all or part of signal for each of the at least two terminal devices from the combined signal.

Clause 38. An electronic device for a terminal device, the terminal device being a slave terminal device in a cluster, and the cluster further comprising a master terminal device, the electronic device comprising a processing circuit configured to:
generate cluster ACK feedback based on ACK feedback from each terminal device in the cluster, the cluster ACK feedback indicating that each terminal device in the cluster correctly received data transmission from a control device;
for data transmissions from the control device to a plurality of terminal devices in the cluster:
send hybrid automatic repeat request (HARQ) feedback to the master terminal device, so that the master terminal device generates cluster HARQ feedback based on the HARQ feedback and its own HARQ feedback and sends the cluster HARQ feedback to the control device.

Clause 39. The electronic device of 38, wherein the HARQ feedback includes ACK feedback and NACK feedback, and sending the HARQ feedback to the master terminal device comprising one of:
based on the HARQ feedback being ACK feedback, sending ACK feedback to the master terminal device;
based on the HARQ feedback being NACK feedback, sending NACK feedback to the master terminal device or sending no NACK feedback.

Clause 40. The electronic device of Clause 38, wherein the processing circuit is further configured to:
receive a signal from the control device, wherein the signal comprises a combined signal including all or part of signals for at least two terminal devices; and
obtain all or part of signal for each of the at least two terminal devices from the combined signal.

Clause 41. The electronic device of Clause 40, wherein the processing circuit is further configured to:
in response to receiving and combining the signal for the terminal device from the control device or one or more other terminal devices, send ACK feedback to the master terminal device.

Clause 42. A method for a control device in communication with a plurality of terminal devices, the method comprising:
generating signals for the plurality of terminal devices;
generating signals to be sent to the plurality of terminal devices based on the signals for the plurality of terminal devices, the signals comprising a combined signal to be sent to at least one of the plurality of terminal devices, the combined signal including all or part of signals for at least two terminal devices to facilitate signal reception by the at least two terminal devices; and
sending the signals to the plurality of terminal devices.

Clause 43. A method for a terminal device, the method comprising:
receiving a signal from a control device, wherein the signal comprises a combined signal including all or part of signals for at least two terminal devices; and
obtaining all or part of signal for each of the at least two terminal devices from the combined signal.

Clause 44. A method for a control device in communication with a plurality of terminal devices in a cluster, the plurality of terminal devices comprising a master terminal device and one or more slave terminal devices, the method comprising:
for data transmissions from the control device to the plurality of terminal devices in the cluster, receiving cluster hybrid automatic repeat request (HARQ) feedback from the master terminal device, wherein the cluster HARQ feedback is generated based on HARQ feedback from the master terminal device and HARQ feedback sent from the slave terminal devices to the master terminal device.

Clause 45. A method for an terminal device, the terminal device being a master terminal device in a cluster, and the cluster further comprising one or more slave terminal devices, the method comprising:
for data transmissions from a control device to a plurality of terminal devices in the cluster:
receiving hybrid automatic repeat request (HARQ) feedback from slave terminal devices in the cluster;
generating cluster HARQ feedback based on its own HARQ feedback and the received HARQ feedback from the slave terminal devices; and
sending the cluster HARQ feedback to the control device.

Clause 46. A method for a terminal device, the terminal device being a slave terminal device in a cluster, and the cluster further comprising a master terminal device, the method comprising:
for data transmissions from the control device to a plurality of terminal devices in the cluster:
sending hybrid automatic repeat request (HARQ) feedback to the master terminal device, so that the master terminal device generates cluster HARQ feedback based on the HARQ feedback and its own HARQ feedback and sends the cluster HARQ feedback to the control device.

Clause 47. A computer-readable storage medium having stored thereon one or more instructions that, when executed by one or more processors of an electronic device, cause the electronic device to perform the method of any of Clause 42-46.

Clause 48. An apparatus for wireless communication, the apparatus comprising means for performing the operations of the method of any of Clauses 42-46.

It should be noted that the application examples described above are merely exemplary. The embodiments of the present disclosure can also be executed in any other appropriate manner in the above application examples, and the advantageous effects obtained by the embodiments of the present disclosure can still be achieved. Moreover, the embodiments of the present disclosure can also be applied to other similar application instances, and the advantageous effects obtained by the embodiments of the present disclosure can still be achieved.

It should be understood that machine-executable instructions in a machine-readable storage medium or program product according to embodiments of the present disclosure may be configured to perform operations corresponding to the device and method embodiments described above. When referring to the above device and method embodiments, the embodiments of the machine-readable storage medium or program product will be apparent to those skilled in the art, and therefore description thereof will not be repeated. Machine-readable storage media and program products for carrying or including the above machine-executable instructions also fall within the scope of the present disclosure. Such storage media may include, but are not limited to, floppy disks, optical disks, magneto-optical disks, memory cards, memory sticks, and the like.

Figure 11:
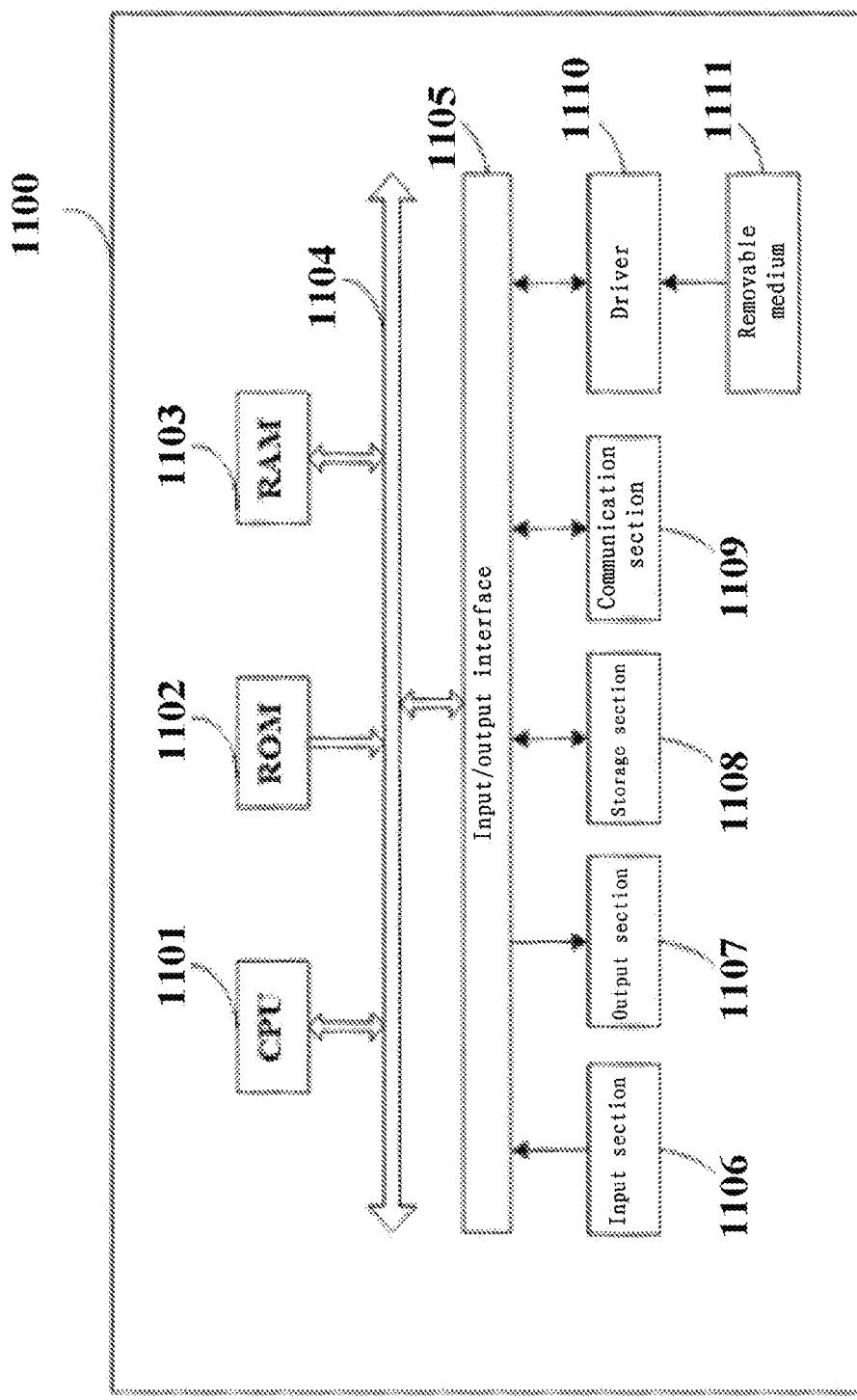
FIG. 11 is a block diagram of an example structure of a personal computer as an information processing device that can be employed in an embodiment of the present disclosure.

In addition, it should be understood that the above series of processes and devices may also be implemented by software and/or firmware. In a case of being implemented by software and/or firmware, a program constituting the software is installed from a storage medium or a network to a computer having a dedicated hardware structure, such as a general-purpose personal computer 1100 shown in FIG. 11, which, when is installed with various programs, can perform various functions and so on. FIG. 11 is a block diagram showing an example structure of a personal computer as an information processing apparatus that can be employed in an embodiment of the present disclosure. In one example, the personal computer may correspond to the above exemplary terminal device according to the present disclosure.

In FIG. 11, a central processing unit (CPU) 1101 executes various processes according to a program stored in a read only memory (ROM) 1102 or a program loaded from a storage section 1108 to a random access memory (RAM) 1103. In the RAM 1103, data required when the CPU 1101 executes various processes and the like is also stored as necessary.

The CPU 1101, the ROM 1102, and the RAM 1103 are connected to each other via a bus 1104. Input/output interface 1105 is also connected to the bus 1104.

The following components are connected to the input/output interface 1105: an input section 1106 including a keyboard, mouse, etc.; an output section 1107 including a display such as a cathode ray tube (CRT), a liquid crystal display (LCD), etc., and a speaker, etc.; the storage section 1108 including a hard disk etc.; and a communication section 1109 including a network interface card such as a LAN card, a modem, etc. The communication section 1109 performs communication processing via a network such as the Internet.

The driver 1110 is also connected to the input/output interface 1105 as needed. A removable medium 1111 such as a magnetic disk, an optical disk, a magneto-optical disk, a semiconductor memory and the like is mounted on the drive 1110 as needed, so that a computer program read therefrom is installed into the storage section 1108 as needed.

In a case that the above series of processing is implemented by software, a program constituting the software is installed from a network such as the Internet or a storage medium such as a removable medium 1111.

It should be understood by those skilled in the art that such a storage medium is not limited to the removable medium 1111 shown in FIG. 11 in which a program is stored and distributed separately from the device to provide the program to the user. Examples of the removable media 1111 include a magnetic disk (including floppy disks (registered trademark)), optical disks (including compact disk read only memory (CD-ROM) and digital versatile disks (DVD)), magneto-optical disks (including mini discs (MD) (registered trademark)) and semiconductor memories. Alternatively, the storage medium may be the ROM 1102, a hard disk included in the storage section 1108, or the like, in which programs are stored and distributed to users together with the devices containing them.

The techniques of the present disclosure can be applied to various products.

For example, the electronic device 200 according to an embodiment of the present disclosure can be implemented as or included in various control devices/base stations, while the method shown in FIG. 9A and/or 10A may also be implemented by various control devices/base stations. For example, the electronic devices 300 according to the embodiments of the present disclosure can be implemented as or included in various terminal devices/user equipment, while the methods shown in FIGS. 9B-9C and/or 10B may also be implemented by various terminal devices/user equipment.

For example, the control device/base station mentioned in this disclosure can be implemented as any type of base station, e.g., an evolved Node B (gNB), such as a macro gNB and a small gNB. The small gNBs can be a gNB covering a cell smaller than macro cell, such as a pico gNB, a micro gNB, and a home (femto) gNB. Alternatively, the base station can be implemented as any other type of base station, such as a NodeB and a Base Transceiver Station (BTS). The base station can include: a body (also referred to as a base station device) configured to control wireless communication; and one or more Remote Radio Heads (RRHs) disposed at a different place from the body. In addition, various types of terminals to be described below can each operate as a base station by temporarily or semi-persistently performing base station functions.

For example, the terminal devices mentioned in this disclosure, also referred to as user equipment in some examples, can be implemented as mobile terminals (such as smart phones, tablet personal computers (PCs), notebook PCs, portable game terminals, portable/dongle-type mobile routers and digital cameras) or in-vehicle terminals (such as car navigation devices). The user equipment may also be implemented as terminals performing machine-to-machine (M2M) communication (also referred to as machine type communication (MTC) terminals). Furthermore, the user equipment may be wireless communication modules (such as integrated circuit modules comprising a single die) mounted on each of the above terminals. In some cases, the user equipment may communicate using a variety of wireless communication technologies. For example, the user equipment may be configured to communicate using two or more of GSM, UMTS, CDMA2000, WiMAX, LTE, LTE-A, WLAN, NR, Bluetooth, and the like. In some cases, the user equipment may also be configured to communicate using only one wireless communication technology.

Examples according to the present disclosure will be described below with reference to FIGS. 12 to 15.

Examples of Base Stations

It should be understood that the term base station in this disclosure has the full breadth of its ordinary meaning and includes at least a wireless communication station used as part of a wireless communication system or a radio system to facilitate communication. Examples of base stations may be, for example, but not limited to: a base station may be one or both of a base transceiver station (BTS) and a base station controller (BSC) in a GSM system, may be one or both of a radio network controller (RNC) and Node B in a WCDMA system, may be an eNB in a LTE and LTE-Advanced system, or may be a corresponding network node in a future communication system (for example, a gNB, an eLTE eNB and the like that may appear in a 5G communication system). Some functions in the base stations of the present disclosure may also be implemented as entities with control functions to communication in D2D, M2M and V2V communication scenarios, or as entities with spectrum coordination functions in cognitive radio communication scenarios.

First Example

Figure 12:
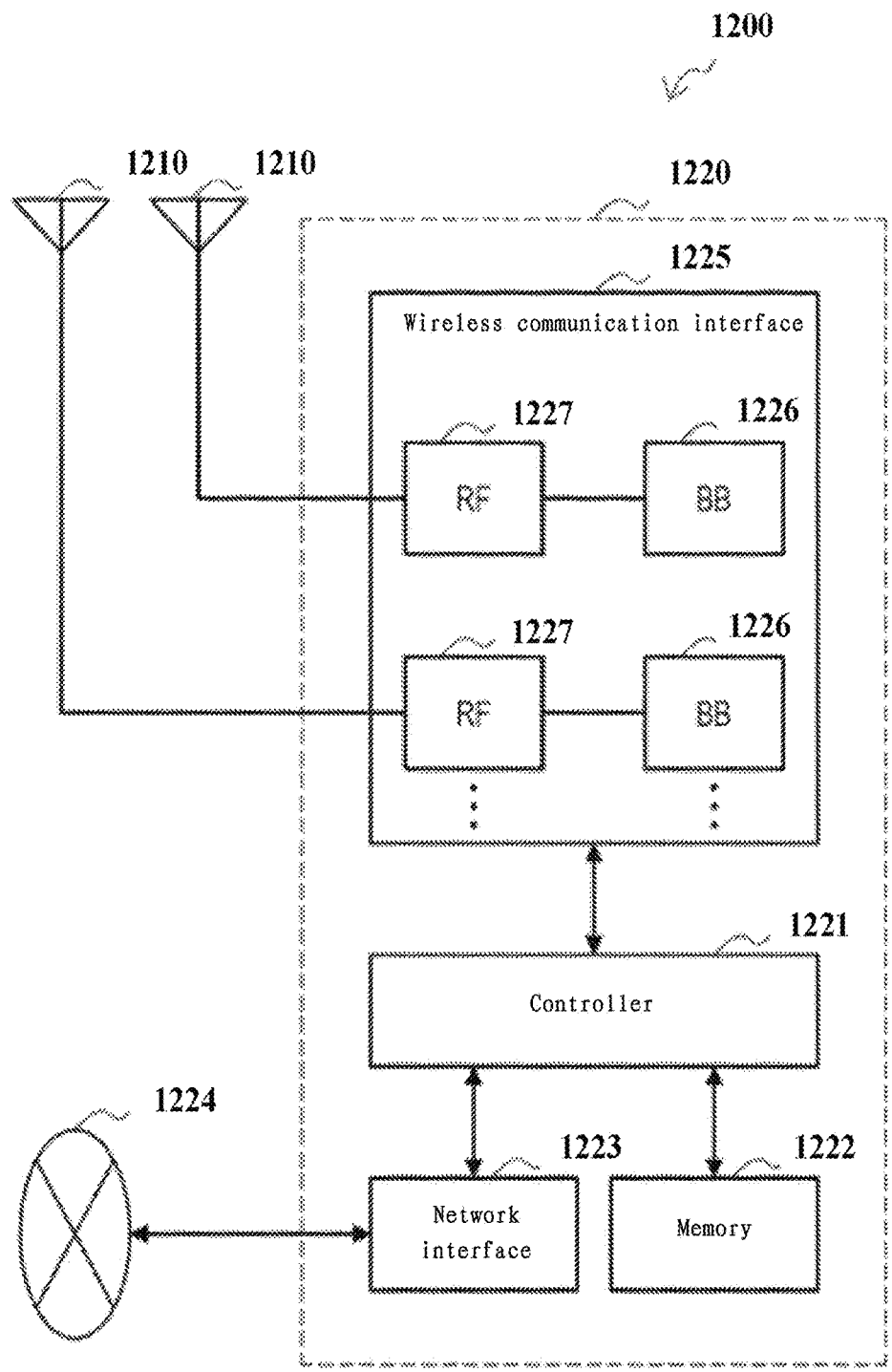
FIG. 12 is a block diagram showing a first example of a schematic configuration of a base station to which the technology of the present disclosure can be applied.

FIG. 12 is a block diagram showing a first example of a schematic configuration of a base station (a gNB is taken as an example in this figure) to which the technology of the present disclosure can be applied. The gNB 1200 includes multiple antennas 1210 and a base station device 1220. The base station device 1220 and each antenna 1210 may be connected to each other via an RF cable. In one implementation, the gNB 1200 (or the base station device 1220) here may correspond to the above control device 101 (or more specifically, the electronic device 200).

Figure 13:
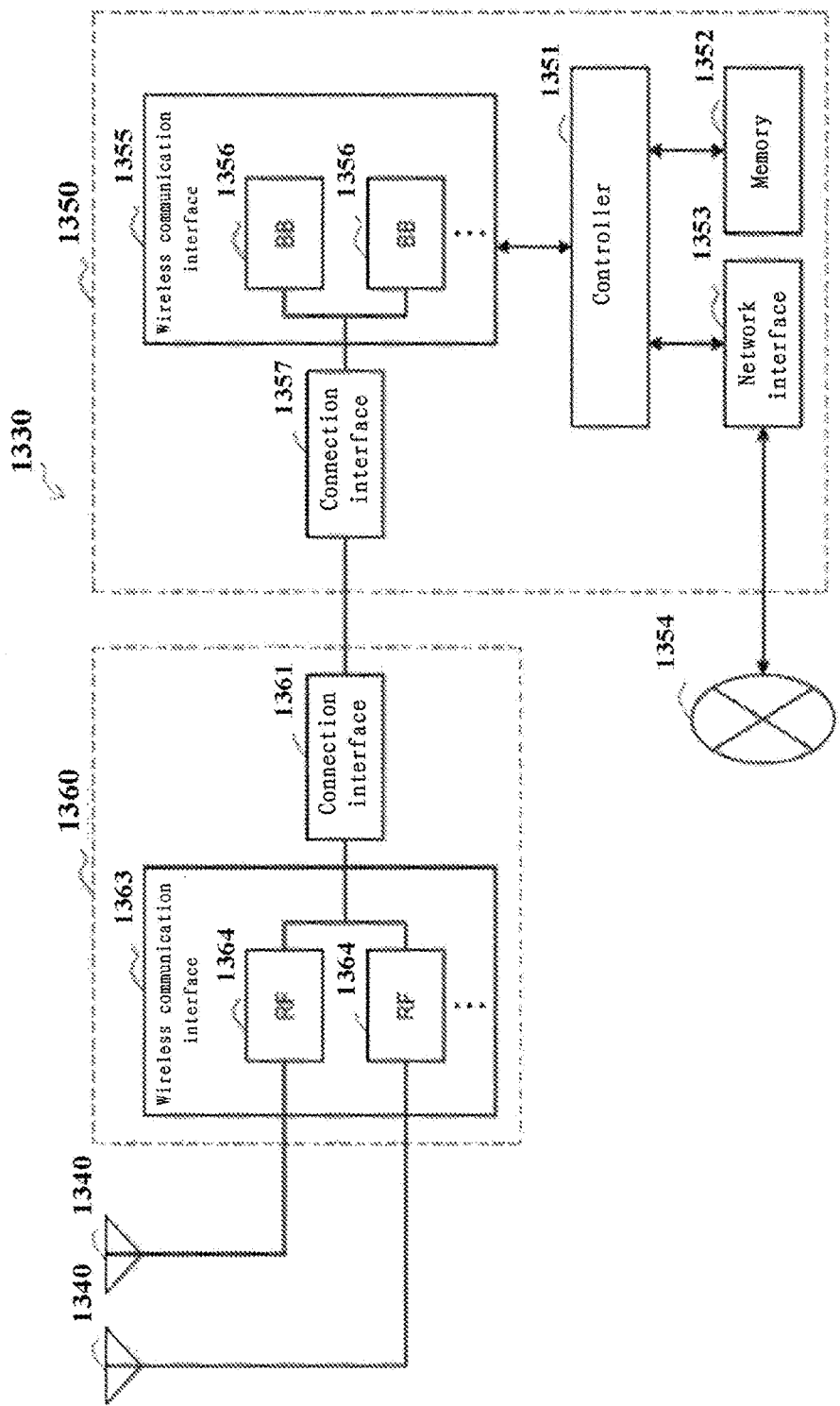
FIG. 13 is a block diagram showing a second example of a schematic configuration of a base station to which the technology of the present disclosure can be applied.

Each of the antennas 1210 includes a single or multiple antenna elements (such as multiple antenna elements included in a multiple-input multiple-output (MIMO) antenna), and is used by the base station device 1220 to transmit and receive wireless signals. As shown in FIG. 13, the gNB 1200 may include multiple antennas 1210. For example, the multiple antennas 1210 may be compatible with multiple frequency bands used by the gNB 1200.

The base station device 1220 includes a controller 1221, a memory 1222, a network interface 1223, and a wireless communication interface 1225.

The controller 1221 may be, for example, a CPU or a DSP, and operates various functions of a higher layer of the base station device 1220. For example, the controller 1221 generates data packets from the data in the signal processed by the wireless communication interface 1225, and delivers the generated packets via the network interface 1223. The controller 1221 may bundle data from a plurality of baseband processors to generate a bundled packet, and deliver the generated bundled packet. The controller 1221 may have logical functions to perform controls such as radio resource control, radio bearer control, mobility management, admission control, and scheduling. These controls can be performed in conjunction with nearby gNBs or core network nodes. The memory 1222 includes RAM and ROM, and stores programs executed by the controller 1221 and various types of control data (such as a terminal list, transmission power data, and scheduling data).

The network interface 1223 is a communication interface for connecting the base station device 1220 to the core network 1224. The controller 1221 may communicate with core network nodes or further gNBs via the network interface 1223. In this case, the gNB 1200 and core network nodes or other gNBs may be connected to each other through logical interfaces (such as S1 interface and X2 interface). The network interface 1223 may also be a wired communication interface or a wireless communication interface for wireless backhaul. If the network interface 1223 is a wireless communication interface, the network interface 1223 may use a higher frequency band for wireless communication than the frequency band used by the wireless communication interface 1225.

The wireless communication interface 1225 supports any cellular communication scheme (such as Long Term Evolution (LTE) and LTE-Advanced), and provides wireless connectivity to terminals located in cells of the gNB 1200 via the antenna 1210. The wireless communication interface 1225 may generally include, for example, a baseband (BB) processor 1226 and RF circuit 1227. The BB processor 1226 may perform, for example, encoding/decoding, modulation/demodulation, and multiplexing/demultiplexing, and performs various types of signal processing in layers (for example, L1, Medium Access Control (MAC), Radio Link Control (RLC), and Packet Data Convergence Protocol (PDCP)). In place of the controller 1221, the BB processor 1226 may have some or all of the above logical functions. The BB processor 1226 may be a memory storing a communication control program, or a module including a processor and associated circuit configured to execute the program. Updating the program may cause the functionality of the BB processor 1226 to change. The module may be a card or blade that is inserted into a slot in the base station device 1220. Alternatively, the module can also be a chip mounted on a card or blade. Meanwhile, the RF circuit 1227 may include, for example, a mixer, a filter, and an amplifier, and transmit and receive wireless signals via the antenna 1210. Although FIG. 12 illustrates an example in which one RF circuit 1227 is connected to one antenna 1210, the present disclosure is not limited to this, instead, one RF circuit 1227 may connect multiple antennas 1210 at the same time.

As shown in FIG. 12, the wireless communication interface 1225 may include multiple BB processors 1226. For example, the multiple BB processors 1226 may be compatible with multiple frequency bands used by the gNB 1200. As shown in FIG. 12, the wireless communication interface 1225 may include multiple RF circuits 1227. For example, the multiple RF circuits 1227 may be compatible with multiple antenna elements. Although FIG. 12 illustrates an example in which the wireless communication interface 1225 includes multiple BB processors 1226 and multiple RF circuits 1227, the wireless communication interface 1225 may also include a single BB processor 1226 or a single RF circuit 1227.

Second Example

FIG. 13 is a block diagram showing a second example of a schematic configuration of a base station (a gNB is taken as an example in this figure) to which the technology of the present disclosure can be applied. The gNB 1330 includes multiple antennas 1340, a base station device 1350, and a RRH 1360. The RRH 1360 and each antenna 1340 may be connected to each other via an RF cable. The base station device 1350 and the RRH 1360 may be connected to each other via a high-speed line such as an optical fiber cable. In one implementation, the gNB 1330 (or the base station device 1350) here may correspond to the above control device 101 (or more specifically, the electronic device 200).

Each of the antennas 1340 includes a single or multiple antenna elements (such as multiple antenna elements included in a MIMO antenna) and is used by the RRH 1360 to transmit and receive wireless signals. As shown in FIG. 13, the gNB 1330 may include multiple antennas 1340. For example, the multiple antennas 1340 may be compatible with multiple frequency bands used by the gNB 1330.

The base station device 1350 includes a controller 1351, a memory 1352, a network interface 1353, a wireless communication interface 1355, and a connection interface 1357. The controller 1351, the memory 1352 and the network interface 1353 are the same as the controller 1221, the memory 1222 and the network interface 1223 described with reference to FIG. 12.

The wireless communication interface 1355 supports any cellular communication scheme (such as LTE and LTE-Advanced), and provides wireless communication to terminals located in the sector corresponding to RRH 1360 via RRH 1360 and antenna 1340. The wireless communication interface 1355 may generally include, for example, a BBprocessor 1356. The BBprocessor 1356 is the same as the BBprocessor 1226 described with reference to FIG. 12, except that the BB processor 1356 is connected to the RF circuit 1364 of the RRH 1360 via the connection interface 1357. As shown in FIG. 13, the wireless communication interface 1355 may include multiple BB processors 1356. For example, the multiple BB processors 1356 may be compatible with multiple frequency bands used by the gNB 1330. Although FIG. 13 illustrates an example in which the wireless communication interface 1355 includes multiple BB processors 1356, the wireless communication interface 1355 may include a single BB processor 1356.

The connection interface 1357 is an interface for connecting the base station device 1350 (the wireless communication interface 1355) to the RRH 1360. The connection interface 1357 may also be a communication module for communication in the above high-speed line connecting the base station device 1350 (the wireless communication interface 1355) to the RRH 1360.

The RRH 1360 includes a connection interface 1361 and a wireless communication interface 1363.

The connection interface 1361 is an interface for connecting the RRH 1360 (the wireless communication interface 1363) to the base station device 1350. The connection interface 1361 may also be a communication module for communication in the above high-speed line.

The wireless communication interface 1363 transmits and receives wireless signals via the antenna 1340. The wireless communication interface 1363 may typically include an RF circuit 1364, for example. The RF circuit 1364 may include, for example, a mixer, a filter, and an amplifier, and transmit and receive wireless signals via antenna 1340. Although FIG. 13 illustrates an example in which one RF circuit 1364 is connected to one antenna 1340, the present disclosure is not limited to this, instead, one RF circuit 1364 may be connected to multiple antennas 1340 at the same time.

As shown in FIG. 13, the wireless communication interface 1363 may include multiple RF circuits 1364. For example, the multiple RF circuits 1364 may support multiple antenna elements. Although FIG. 13 illustrates an example in which the wireless communication interface 1363 includes multiple RF circuits 1364, the wireless communication interface 1363 may include a single RF circuit 1364.

Examples for User Equipment

First Example

Figure 14:
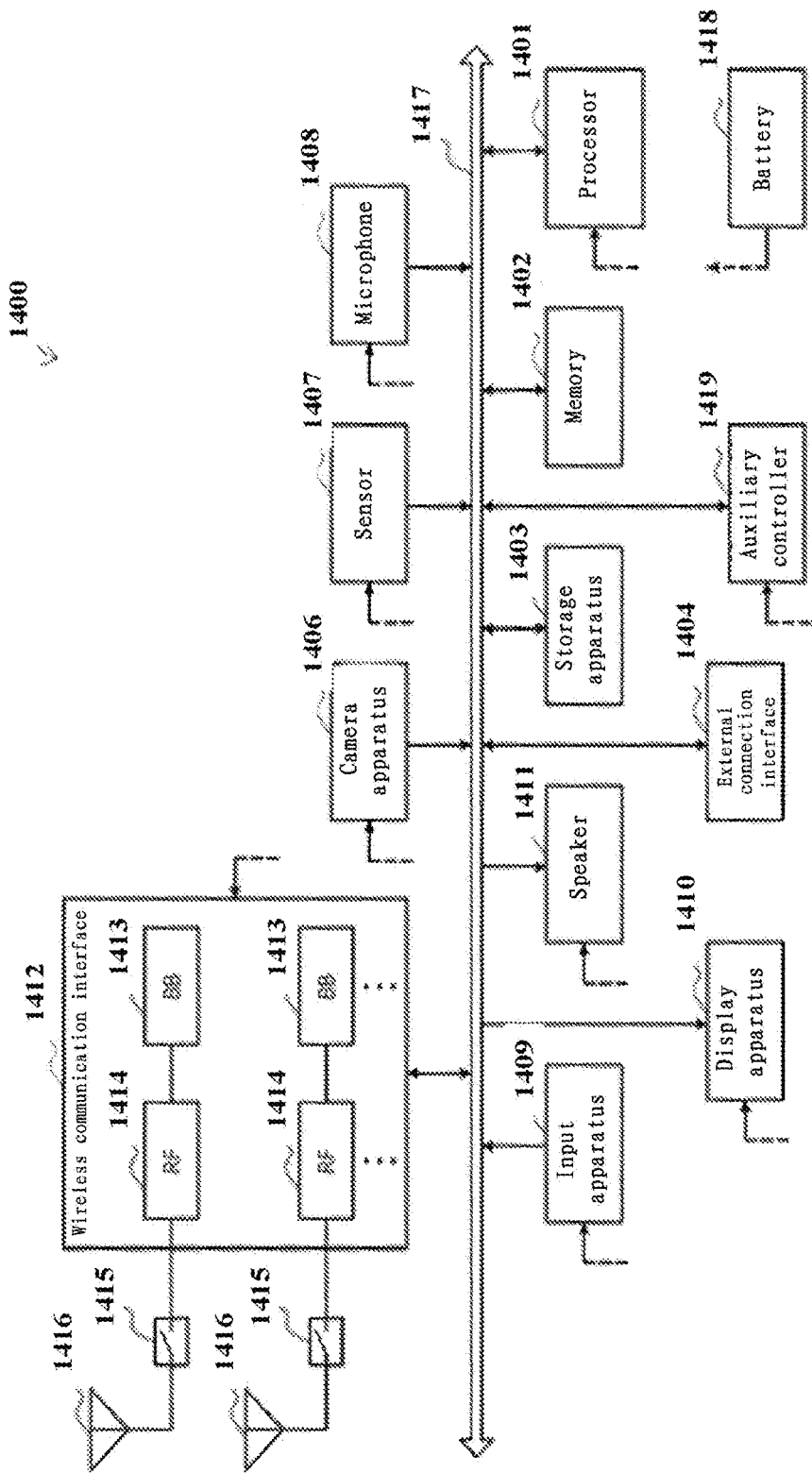
FIG. 14 is a block diagram showing an example of a schematic configuration of a smart phone to which the technology of the present disclosure can be applied.

FIG. 14 is a block diagram showing an example of a schematic configuration of a smart phone 1400 to which the techniques of the present disclosure may be applied. The smart phone 1400 includes a processor 1401, a memory 1402, a storage apparatus 1403, an external connection interface 1404, a camera apparatus 1406, a sensor 1407, a microphone 1408, an input apparatus 1409, a display apparatus 1410, a speaker 1411, a wireless communication interface 1412, one or more antenna switches 1415, one or more antennas 1416, a bus 1417, a battery 1418, and an auxiliary controller 1419. In one implementation, the smart phone 1400 (or the processor 1401) here may correspond to the above terminal device 102 (or more specifically, the electronic devices 300).

The processor 1401 may be, for example, a CPU or a system on a chip (SoC), and controls functions of the application layer and further layers of the smart phone 1400. The memory 1402 includes RAM and ROM, and stores data and programs executed by the processor 1401. The storage apparatus 1403 may include a storage medium such as a semiconductor memory and a hard disk. The external connection interface 1404 is an interface for connecting an external apparatus (such as a memory card and a Universal Serial Bus (USB) apparatus) to the smart phone 1400.

The camera apparatus 1406 includes an image sensor (such as a charge coupled device (CCD) and a complementary metal oxide semiconductor (CMOS)), and generates captured images. The sensor 1407 may include a set of sensors, such as measurement sensors, gyroscope sensors, geomagnetic sensors, and acceleration sensors. The microphone 1408 converts the sound input to the smart phone 1400 into an audio signal. The input apparatus 1409 includes, for example, a touch sensor configured to detect a touch on the screen of the display apparatus 1410, a keypad, a keyboard, a button, or a switch, and receives operations or information input from a user. The display apparatus 1410 includes a screen (such as a liquid crystal display (LCD) and an organic light emitting diode (OLED) display), and displays an output image of the smart phone 1400. The speaker 1411 converts an audio signal output from the smart phone 1400 into sound.

The wireless communication interface 1412 supports any cellular communication scheme (such as LTE and LTE-Advanced), and performs wireless communication. The wireless communication interface 1412 may generally include, for example, a BB processor 1413 and an RF circuit 1414. The BB processor 1413 may perform, for example, encoding/decoding, modulation/demodulation, and multiplexing/demultiplexing, and perform various types of signal processing for wireless communication. Meanwhile, the RF circuit 1414 may include, for example, a mixer, a filter, and an amplifier, and transmit and receive wireless signals via the antenna 1416. The wireless communication interface 1412 may be a chip module on which the BB processor 1413 and the RF circuit 1414 are integrated. As shown in FIG. 14, the wireless communication interface 1412 may include multiple BB processors 1413 and multiple RF circuits 1414. Although FIG. 14 illustrates an example in which the wireless communication interface 1412 includes multiple BB processors 1413 and multiple RF circuits 1414, the wireless communication interface 1412 may include a single BB processor 1413 or a single RF circuit 1414.

Furthermore, in addition to cellular communication schemes, the wireless communication interface 1412 may support additional types of wireless communication schemes, such as short-range wireless communication schemes, near field communication schemes, and wireless local area network (LAN) schemes. In this case, the wireless communication interface 1412 may include a BB processor 1413 and an RF circuit 1414 for each wireless communication scheme.

Each of the antenna switches 1415 switches the connection destination of the antenna 1416 among a plurality of circuits (e.g., circuits for different wireless communication schemes) included in the wireless communication interface 1412.

Each of the antennas 1416 includes a single or multiple antenna elements (such as multiple antenna elements included in a MIMO antenna), and is used for the wireless communication interface 1412 to transmit and receive wireless signals. As shown in FIG. 14, the smart phone 1400 may include multiple antennas 1416. Although FIG. 14 illustrates an example in which the smart phone 1400 includes multiple antennas 1416, the smart phone 1400 may also include a single antenna 1416.

Furthermore, the smart phone 1400 may include an antenna 1416 for each wireless communication scheme. In this case, the antenna switch 1415 can be omitted from the configuration of the smart phone 1400.

The bus 1417 connects the processor 1401, the memory 1402, the storage apparatus 1403, the external connection interface 1404, the camera apparatus 1406, the sensor 1407, the microphone 1408, the input apparatus 1409, the display apparatus 1410, the speaker 1411, the wireless communication interface 1412, and the auxiliary controller 1419 to each other. The battery 1418 provides power to the various blocks of the smart phone 1400 shown in FIG. 14 via feeders, which are partially shown in dashed lines in the figure. The auxiliary controller 1419 operates the minimum necessary functions of the smart phone 1400, e.g., in sleep mode.

Second Example

Figure 15:
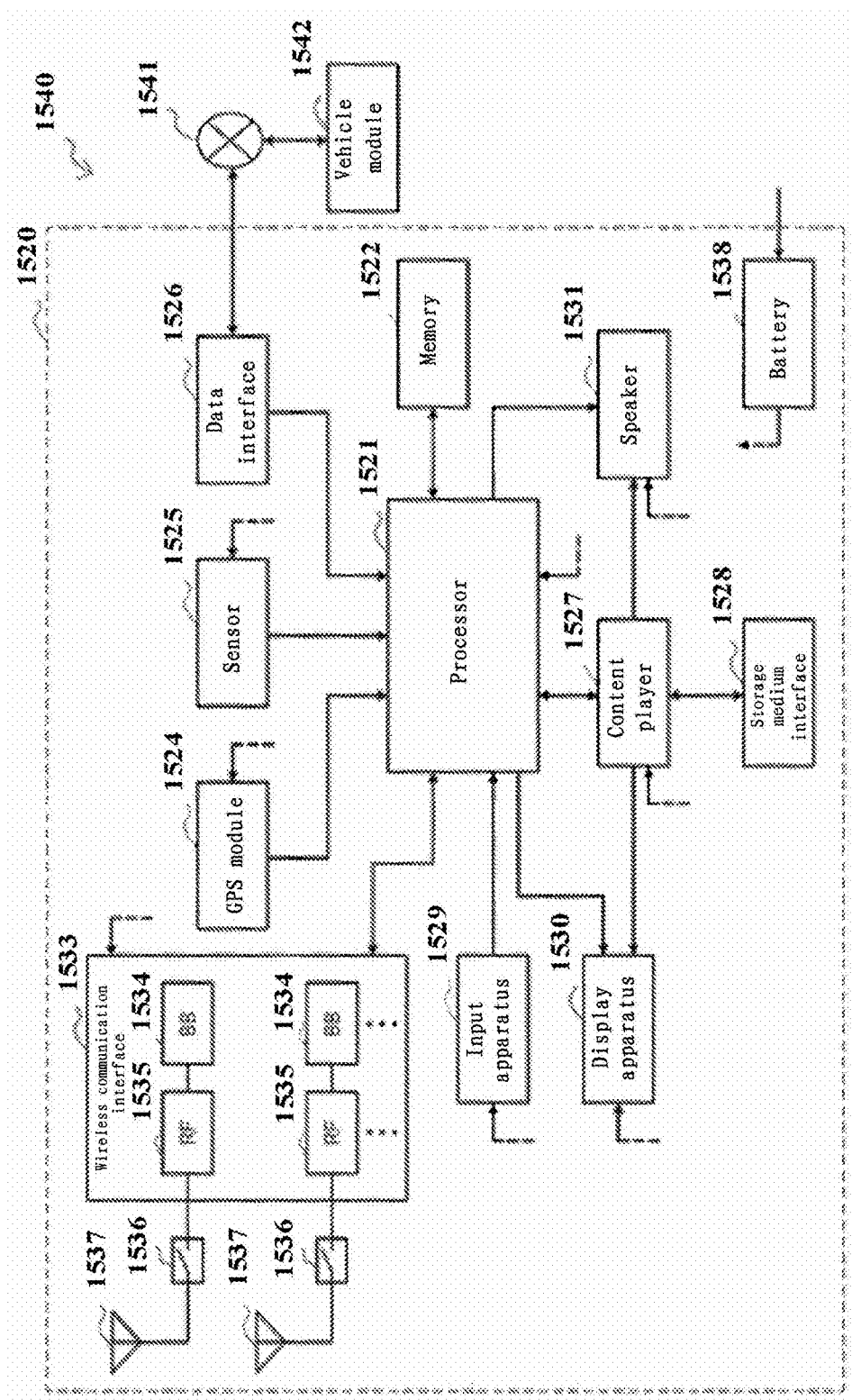
FIG. 15 is a block diagram showing an example of a schematic configuration of a car navigation device to which the technology of the present disclosure can be applied.

FIG. 15 is a block diagram showing an example of a schematic configuration of a car navigation device 1520 to which the technology of the present disclosure can be applied. The car navigation device 1520 includes a processor 1521, a memory 1522, a global positioning system (GPS) module 1524, a sensor 1525, a data interface 1526, a content player 1527, a storage medium interface 1528, an input apparatus 1529, a display apparatus 1530, a speaker 1531, a wireless Communication interface 1533, one or more antenna switches 1536, one or more antennas 1537, and battery 1538. In one implementation, the car navigation device 1520 (or the processor 1521) here may correspond to the above terminal device 102 (or more specifically, the electronic device 300).

The processor 1521 can be, for example, a CPU or a SoC, and controls the navigation function and other functions of the car navigation device 1520. The memory 1522 includes RAM and ROM, and stores data and programs executed by the processor 1521.

The GPS module 1524 uses GPS signals received from GPS satellites to measure the location (such as latitude, longitude, and altitude) of the car navigation device 1520. The sensor 1525 may include a set of sensors such as a gyroscope sensor, a geomagnetic sensor, and an air pressure sensor. The data interface 1526 is connected to, for example, a in-vehicle network 1541 via a terminal not shown, and acquires data (such as vehicle speed data) generated by the vehicle.

The content player 1527 reproduces content stored in storage media (such as CDs and DVDs), which are inserted into the storage media interface 1528. The input apparatus 1529 includes, for example, a touch sensor configured to detect a touch on the screen of the display apparatus 1530, a button, or a switch, and receives operations or information input from a user. The display apparatus 1530 includes a screen such as an LCD or OLED display, and displays images of a navigation function or reproduced content. The speaker 1531 outputs the sound of the navigation function or the reproduced content.

The wireless communication interface 1533 supports any cellular communication scheme (such as LTE and LTE-Advanced), and performs wireless communication. The wireless communication interface 1533 may generally include, for example, BB processor 1534 and RF circuit 1535. The BB processor 1534 may perform, for example, encoding/decoding, modulation/demodulation, and multiplexing/demultiplexing, and perform various types of signal processing for wireless communication. Meanwhile, the RF circuit 1535 may include, for example, a mixer, a filter, and an amplifier, and transmit and receive wireless signals via the antenna 1537. The wireless communication interface 1533 can also be a chip module on which the BB processor 1534 and the RF circuit 1535 are integrated. As shown in FIG. 15, the wireless communication interface 1533 may include multiple BB processors 1534 and multiple RF circuits 1535. Although FIG. 15 illustrates an example in which the wireless communication interface 1533 includes multiple BB processors 1534 and multiple RF circuits 1535, the wireless communication interface 1533 may also include a single BB processor 1534 or a single RF circuit 1535.

Furthermore, in addition to the cellular communication scheme, the wireless communication interface 1533 may support another type of wireless communication scheme, such as a short-range wireless communication scheme, a near field communication scheme, and a wireless LAN scheme. In this case, the wireless communication interface 1533 may include the BB processor 1534 and the RF circuit 1535 for each wireless communication scheme.

Each of the antenna switches 1536 switches the connection destination of the antenna 1537 among a plurality of circuits (such as circuits for different wireless communication schemes) included in the wireless communication interface 1533.

Each of the antennas 1537 includes a single or multiple antenna elements (such as multiple antenna elements included in a MIMO antenna), and is used for the wireless communication interface 1533 to transmit and receive wireless signals. As shown in FIG. 15, the car navigation device 1520 may include multiple antennas 1537. Although FIG. 15 illustrates an example in which the car navigation device 1520 includes multiple antennas 1537, the car navigation device 1520 may also include a single antenna 1537.

Furthermore, the car navigation device 1520 may include an antenna 1537 for each wireless communication scheme. In this case, the antenna switch 1536 may be omitted from the configuration of the car navigation device 1520.

The battery 1538 provides power to various blocks of the car navigation device 1520 shown in FIG. 15 via feeders, which are partially shown in dashed lines in the figure. The battery 1538 accumulates power supplied from the vehicle.

The techniques of this disclosure may also be implemented as an in-vehicle system (or vehicle) 1540 including one or more blocks of the car navigation device 1520, the in-vehicle network 1541, and the vehicle module 1542. The vehicle module 1542 generates vehicle data (such as vehicle speed, engine speed, and fault information), and outputs the generated data to the in-vehicle network 1541.

The exemplary embodiments of the present disclosure have been described above with reference to the drawings, but the present disclosure is not of course limited to the above examples. Those skilled in the art may find various changes and modifications within the scope of the appended claims, and it should be understood that these changes and modifications will naturally fall within the technical scope of the present disclosure.

For example, a plurality of functions included in one unit in the above embodiments may be implemented by separate apparatus. Alternatively, the plurality of functions implemented by multiple units in the above embodiments may be implemented by separate apparatus, respectively. Additionally, one of the above functions may be implemented by multiple units. Needless to say, such a configuration is included in the technical scope of the present disclosure.

In this specification, the steps described in the flowchart include not only processes performed in time sequence in the stated order, but also processes performed in parallel or individually rather than necessarily in time sequence. Furthermore, even in the steps processed in time sequence, needless to say, the order can be appropriately changed.

Although the present disclosure and its advantages have been described in detail, it should be understood that various changes, substitutions and alterations can be made herein without departing from the spirit and scope of the disclosure as defined by the appended claims. Furthermore, the terms "comprise", "include" or any other variation thereof in embodiments of the present disclosure are intended to encompass a non-exclusive inclusion, such that a process, method, article or device comprising a series of elements includes not only those elements, but also include other elements not expressly listed, or include elements inherent to such process, method, article or device. Without further limitation, an element defined by the phrase "comprising one . . . " does not preclude the presence of additional identical elements in a process, method, article or device that includes the element.

What is claimed is:

1. An electronic device comprising a processing circuit configured to:
    select a first terminal device combined signal mode for transmitting a first terminal device combined signal to a first terminal device,
    select a second terminal device combined signal mode for transmitting a second terminal device combined signal to a second terminal device,
    wherein the first and second terminal device combined signal modes are individually selected based on respective first and second terminal code rates from a set of combined signal modes comprising:
        a first combined signal mode comprising each of a data segment for the first terminal device and a data segment for the second terminal device,
        a second combined signal mode comprising each of the data segment for the first terminal device and a parity bit segment corresponding to the data segment for the second terminal device,
        a third combined signal mode comprising each of the data segment for the second terminal device and a parity bit segment corresponding to the data segment for first second terminal device, and
        a fourth combined signal mode comprising each of the parity bit segment corresponding to the data segment for first second terminal device and the parity bit segment corresponding to the data segment for the second terminal device,
    transmit, via downlink control information (DCI) or by a Media Access Control (MAC) layer control element, codebook information to the first and second terminal devices, the codebook information indicating:
        the first and second terminal device combined signal modes that were individually selected from the set of combined signal modes, and
        information identifying lengths of each segment of the corresponding first and second terminal device combined signal modes, and
    in accordance with the transmitted codebook information, transmit a first and second signal to the first terminal device, and a third and fourth signal to the second terminal device,
    wherein the first signal transmitted to the first terminal device includes the data segment for the first terminal device and the parity bit segment corresponding to the data segment for first second terminal device,
    wherein the second signal transmitted to the first terminal device includes the first terminal device combined signal and first terminal device combined signal parity bits,
    wherein the third signal transmitted to the second terminal device includes data segment for the second terminal device and the parity bit segment corresponding to the data segment for the second terminal device, and
    wherein the fourth signal transmitted to the second terminal device includes the second terminal device combined signal and second terminal device combined signal parity bits.

2. A method performed by an electronic device and comprising:
    selecting a first terminal device combined signal mode for transmitting a first terminal device combined signal to a first terminal device,
    selecting a second terminal device combined signal mode for transmitting a second terminal device combined signal to a second terminal device,
    wherein the first and second terminal device combined signal modes are individually selected based on respective first and second terminal code rates from a set of combined signal modes comprising:
        a first combined signal mode comprising each of a data segment for the first terminal device and a data segment for the second terminal device,
        a second combined signal mode comprising each of the data segment for the first terminal device and a parity bit segment corresponding to the data segment for the second terminal device,
        a third combined signal mode comprising each of the data segment for the second terminal device and a parity bit segment corresponding to the data segment for first second terminal device, and
        a fourth combined signal mode comprising each of the parity bit segment corresponding to the data segment for first second terminal device and the parity bit segment corresponding to the data segment for the second terminal device,
    transmitting, via downlink control information (DCI) or by a Media Access Control (MAC) layer control element, codebook information to the first and second terminal devices, the codebook information indicating:
        the first and second terminal device combined signal modes that were individually selected from the set of combined signal modes, and
        information identifying lengths of each segment of the corresponding first and second terminal device combined signal modes; and
    in accordance with the transmitted codebook information, transmitting a first and second signal to the first terminal device, and a third and fourth signal to the second terminal device,
    wherein the first signal transmitted to the first terminal device includes the data segment for the first terminal device and the parity bit segment corresponding to the data segment for first second terminal device, wherein the second signal transmitted to the first terminal device includes the first terminal device combined signal and first terminal device combined signal parity bits, wherein the third signal transmitted to the second terminal device includes data segment for the second terminal device and the parity bit segment corresponding to the data segment for the second terminal device, and wherein the fourth signal transmitted to the second terminal device includes the second terminal device combined signal and second terminal device combined signal parity bits.

3. A non-transitory computer product containing instructions for causing an electronic device to perform a method, the method comprising:

selecting a first terminal device combined signal mode for transmitting a first terminal device combined signal to a first terminal device, selecting a second terminal device combined signal mode for transmitting a second terminal device combined signal to a second terminal device, wherein the first and second terminal device combined signal modes are individually selected based on respective first and second terminal code rates from a set of combined signal modes comprising:

a first combined signal mode comprising each of a data segment for the first terminal device and a data segment for the second terminal device, a second combined signal mode comprising each of the data segment for the first terminal device and a parity bit segment corresponding to the data segment for the second terminal device, a third combined signal mode comprising each of the data segment for the second terminal device and a parity bit segment corresponding to the data segment for first second terminal device, and a fourth combined signal mode comprising each of the parity bit segment corresponding to the data segment for first second terminal device and the parity bit segment corresponding to the data segment for the second terminal device, transmitting, via downlink control information (DCI) or by a Media Access Control (MAC) layer control element, codebook information to the first and second terminal devices, the codebook information indicating:

the first and second terminal device combined signal modes that were individually selected from the set of combined signal modes, and information identifying lengths of each segment of the corresponding first and second terminal device combined signal modes; and in accordance with the transmitted codebook information, transmitting a first and second signal to the first terminal device, and a third and fourth signal to the second terminal device, wherein the first signal transmitted to the first terminal device includes the data segment for the first terminal device and the parity bit segment corresponding to the data segment for first second terminal device, wherein the second signal transmitted to the first terminal device includes the first terminal device combined signal and first terminal device combined signal parity bits, wherein the third signal transmitted to the second terminal device includes data segment for the second terminal device and the parity bit segment corresponding to the data segment for the second terminal device, and wherein the fourth signal transmitted to the second terminal device includes the second terminal device combined signal and second terminal device combined signal parity bits.

\* \* \* \* \*